(12) United States Patent
Lin

(10) Patent No.: US 11,733,828 B2
(45) Date of Patent: Aug. 22, 2023

(54) ICON MOVING METHOD AND TERMINAL DEVICE

(71) Applicant: VIVO MOBILE COMMUNICATION CO., LTD., Guangdong (CN)

(72) Inventor: Xiongzhou Lin, Guangdong (CN)

(73) Assignee: VIVO MOBILE COMMUNICATION CO., LTD., Guangdong (CN)

(\*) Notice: Subject to any disclaimer, the term of this patent is extended or adjusted under 35 U.S.C. 154(b) by 0 days.

(21) Appl. No.: 17/575,247

(22) Filed: Jan. 13, 2022

(65) Prior Publication Data

US 2022/0137791 A1    May 5, 2022

Related U.S. Application Data

(63) Continuation of application No. PCT/CN2020/100000, filed on Jul. 2, 2020.

(30) Foreign Application Priority Data

Jul. 22, 2019  (CN) .......................... 201910660801.3

(51) Int. Cl.
*G06F 3/04817*     (2022.01)
*H04M 1/72469*     (2021.01)
(Continued)

(52) U.S. Cl.
CPC ........ *G06F 3/04817* (2013.01); *G06F 1/1647* (2013.01); *G06F 3/04842* (2013.01); *G06F 3/1423* (2013.01); *H04M 1/72469* (2021.01); *G06F 3/0488* (2013.01); *G06F 2203/04803* (2013.01); *H04M 2250/16* (2013.01)

(58) Field of Classification Search
CPC .. G06F 1/1647; G06F 3/1423; G06F 3/04817; G06F 3/04842; G06F 2203/04803; G06F 3/0488; H04M 2250/16; H04M 1/72469
See application file for complete search history.

(56) References Cited

U.S. PATENT DOCUMENTS 9,710,149 B2 \* 7/2017 Shim ..................... G06F 3/0488
2007/0252822 A1  11/2007 Kim et al.
(Continued)

FOREIGN PATENT DOCUMENTS

CN   103049170 A   4/2013
CN   106951141 A   7/2017
(Continued)

OTHER PUBLICATIONS

The First Office Action of Priority Application No. CN 201910660801.3 issued by the Chinese Patent Office dated Sep. 2, 2020.
(Continued)

*Primary Examiner* — Nicholas Ulrich
(74) *Attorney, Agent, or Firm* — IP & T Group LLP

(57) ABSTRACT

An icon display method includes: receiving a first input by a user; in response to the first input, displaying a first pattern on a first screen, where the first pattern is used for selecting a first region, and the first region is a region in which the first input is located; receiving a second input on a first icon by the user on a second scree; and in response to the second input, displaying the first icon in the first region.

17 Claims, 14 Drawing Sheets

(51) Int. Cl.
  *G06F 3/04842* (2022.01)
  *G06F 3/14* (2006.01)
  *G06F 1/16* (2006.01)
  *G06F 3/0488* (2022.01)

(56) References Cited

U.S. PATENT DOCUMENTS

| | | | |
|---|---|---|---|
| 2008/0028298 A1* | 1/2008 | Kaneko | G06T 11/60 |
| | | | 715/243 |
| 2012/0236035 A1* | 9/2012 | Kimura | G06F 3/0481 |
| | | | 345/660 |
| 2012/0262495 A1* | 10/2012 | Kobayashi | G06F 1/1616 |
| | | | 345/672 |
| 2014/0101577 A1* | 4/2014 | Kwak | G06F 3/1431 |
| | | | 715/761 |
| 2016/0259497 A1 | 9/2016 | Foss et al. | |
| 2020/0012411 A1 | 1/2020 | Zhang | |

FOREIGN PATENT DOCUMENTS

| | | |
|---|---|---|
| CN | 109213401 A | 1/2019 |
| CN | 109408171 A | 3/2019 |
| CN | 109683763 A | 4/2019 |
| CN | 109683802 A | 4/2019 |
| CN | 109739404 A | 5/2019 |
| CN | 109814772 A | 5/2019 |
| CN | 109857291 A | 6/2019 |
| CN | 110008011 A | 7/2019 |
| CN | 110489029 A | 11/2019 |
| EP | 1791052 A2 | 5/2007 |

OTHER PUBLICATIONS

The Second Office Action of Priority Application No. CN 201910660801.3 issued by the Chinese Patent Office dated Mar. 9, 2021.

International Search Report and Written Opinion of International Application No. PCT/CN2020/100000 issued by the Chinese Patent Office dated Sep. 29, 2020.

* cited by examiner

ICON MOVING METHOD AND TERMINAL DEVICE

CROSS-REFERENCE TO RELATED APPLICATIONS

This application is a Bypass Continuation application of PCT/CN2020/100000 filed on Jul. 2, 2020, which claims priority to Chinese Patent Application No. 201910660801.3, filed on Jul. 22, 2019, which are incorporated herein by reference in their entirety.

TECHNICAL FIELD

Embodiments of this disclosure relate to the field of communications technologies, and in particular, to an icon display method and a terminal device.

BACKGROUND

With the development of communications technologies, multi-screen terminal devices have become a new trend.

SUMMARY

Embodiments of this disclosure provide an icon display method and a terminal device.

According to a first aspect, an embodiment of this disclosure provides an icon display method. The method can be applied to a terminal device including a first screen and a second screen. The method includes: receiving a first input by a user; in response to the first input, displaying a first pattern on the first screen, where the first pattern is used for selecting a first region, and the first region is a region in which the first input is located; receiving a second input on a first icon by the user on the second screen, and in response to the second input, displaying the first icon in the first region.

According to a second aspect, an embodiment of this disclosure further provides a terminal device. The terminal device includes a first screen and a second screen. The terminal device includes a receiving module and a display module. The receiving module is configured to receive a first input by a user; the display module is configured to: in response to the first input received by the receiving module, display a first pattern on the first screen, where the first pattern is used for selecting a first region, and the first region is a region in which the first input is located; the receiving module is further configured to receive a second input on a first icon by the user on the second screen; and the display module is further configured to: in response to the second input, display the first icon in the first region.

According to a third aspect, an embodiment of this disclosure provides a terminal device, including a processor, a memory, and a computer program stored in the memory and executable on the processor. When the computer program is executed by the processor, the steps of the icon display method according to the first aspect are implemented.

According to a fourth aspect, an embodiment of this disclosure provides a non-transitory computer-readable storage medium, where a computer program is stored in the non-transitory computer-readable storage medium, and when the computer program is executed by a processor, the steps of the icon display method according to the first aspect are implemented.

DETAILED DESCRIPTION OF EMBODIMENTS

Figure 1:
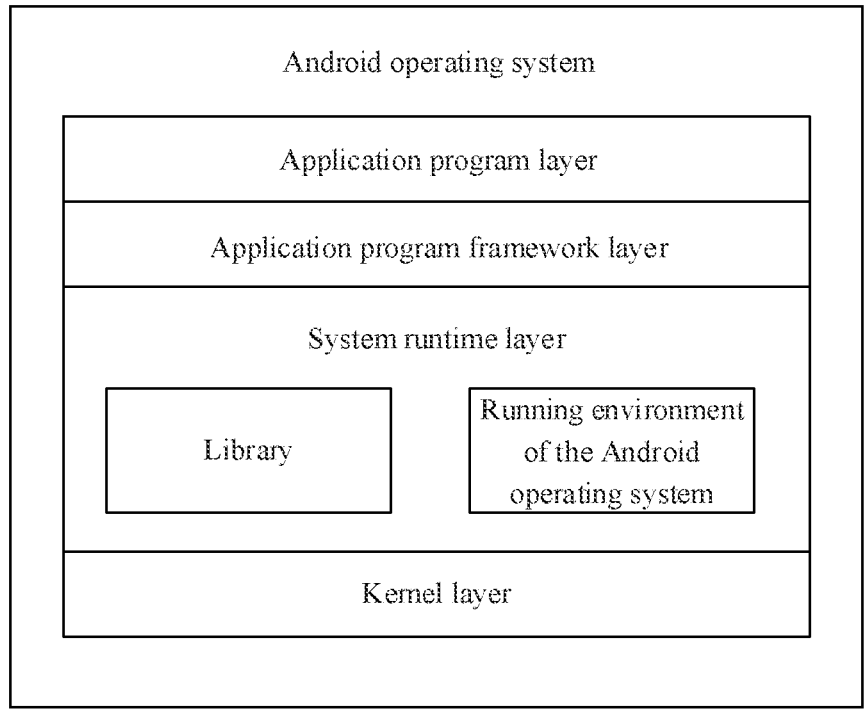
FIG. 1 is a schematic architectural diagram of an Android operating system according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The term "and/or" in this specification describes an association relationship for describing associated objects and represents that three relationships may exist. For example, A and/or B may represent the following three cases: A alone, both A and B, and B alone. The symbol "/" in this specification indicates an "or" relationship between the associated objects, for example, A/B means A or B.

In this specification and claims of this disclosure, the terms such as "first" and "second" are intended to distinguish between similar objects, but not to necessarily describe a specific order of the objects. For example, a first screen and a second screen are used for distinguishing different screens of the terminal device, rather than describing a specific sequence of the screens.

In the embodiments of this disclosure, terms such as "an example" or "for example" are used to represent examples, illustrations, or explanations. Any embodiment or design solution described as "an example" or "for example" in the embodiments of this disclosure should not be construed as preferred or advantageous over other embodiments or design solutions. To be precise, the words such as "an example" or "for example" are intended to present a related concept in a specific manner.

In the description of the embodiments of this disclosure, unless otherwise specified, the meaning of "plurality" means two or more than two. For example, a plurality of components indicate two or more than two components.

Some terms/nouns included in the embodiments of this disclosure are described below.

Aggregate display refers to a manner in which at least one icon dispersed on a screen of a terminal device is gathered to display in a given region on the screen.

In a process of using a multi-screen terminal device, if a user wants to move an icon of an application program from a screen A to a screen B, the user may select the icon and drag the icon to an edge position of the screen A. At that time, the terminal device may prompt the user whether to move the icon to the screen B. If the user confirms moving of the icon, the terminal device may cancel display of the icon on the screen A, and display the icon in a position, adjacent to the edge position, of the screen B. Then, the user may adjust a position of the icon on the screen B.

However, in the foregoing process, for each icon, the user needs to perform a plurality of operations such as a select operation, a drag operation, a confirm operation, and an adjust operation to complete moving the icon between different screens, featuring relatively cumbersome operations of moving an icon between different screens.

The embodiments of this disclosure provide an icon display method and a terminal device. A first input by a user is received; in response to the first input, a first pattern (the first pattern is used for selecting a first region, and the first region is a region in which the first input is located) is displayed on a first screen; a second input on a first icon by the user on a second screen is received; and in response to the second input, the first icon is displayed in the first region. According to this solution, the user can trigger the terminal device through the first input to select the first region on the first screen; therefore, in a case that the first region is in a selected state, the user can move at least one icon from the second screen to the first region of the first screen through the second input. In this way, the user can quickly move at least one icon from one screen to a user-specified region of another screen, with no need to perform a plurality of operations such as drag and confirm, thereby simplifying an operation process of moving an icon between different screens.

The terminal device in the embodiments of this disclosure may be a terminal device with an operating system. The operating system may be an Android operating system, an iOS operating system, or other possible operating systems, and is not specifically limited in the embodiments of this disclosure.

The following uses the Android operating system as an example to describe a software environment to which the icon display method provided in the embodiments of this disclosure is applied.

FIG. 1 is a schematic architectural diagram of an Android operating system according to an embodiment of this disclosure. In FIG. 1, an architecture of the Android operating system includes four layers: an application layer, an application framework layer, a system runtime layer, and a kernel layer (which may be a Linux kernel layer).

The application program layer includes various application programs (including system application programs and third-party application programs) in the Android operating system.

The application program framework layer is a framework of application programs, and developers may develop some application programs based on the application program framework layer in compliance with development principles of the framework of application programs.

The system runtime layer includes a library (also referred to as a system library) and a running environment of the Android operating system. The library mainly provides various resources required by the Android operating system. The running environment of the Android operating system is used to provide a software environment for the Android operating system.

The kernel layer is an operating system layer of the Android operating system, and is a bottom layer in software layers of the Android operating system. The kernel layer provides core system services and hardware-related drivers for the Android operating system based on the Linux kernel.

Using the Android operating system as an example, in the embodiments of this disclosure, a developer may develop, based on the system architecture of the Android operating system shown in FIG. 1, a software program for implementing the icon display method provided in the embodiments of this disclosure, so that the icon display method can be executed based on the Android operating system shown in FIG. 1. In other words, a processor or a terminal device may implement the icon display method provided in the embodiments of this disclosure by running the software program in the Android operating system.

The terminal device in the embodiments of this disclosure may be a mobile terminal device or a non-mobile terminal device. For example, the mobile terminal device may be a mobile phone, a tablet computer, a notebook computer, a palmtop computer, an in-vehicle terminal device, a wearable device, an ultra-mobile personal computer (UMPC), a netbook, a personal digital assistant (PDA), or the like. The non-mobile terminal device may be a personal computer (PC), a television (TV), a teller machine, a self-service machine, or the like. This is not specifically limited in the embodiments of this disclosure.

An execution subject of the icon display method provided in the embodiments of this disclosure may be the terminal device, or may be a functional module and/or functional entity capable of implementing the icon display method in the terminal device. This may be determined based on an actual use requirement, and is not limited in the embodiments of this disclosure. The following uses a terminal device as an example to describe the icon display method provided in the embodiments of this disclosure.

Figure 2:
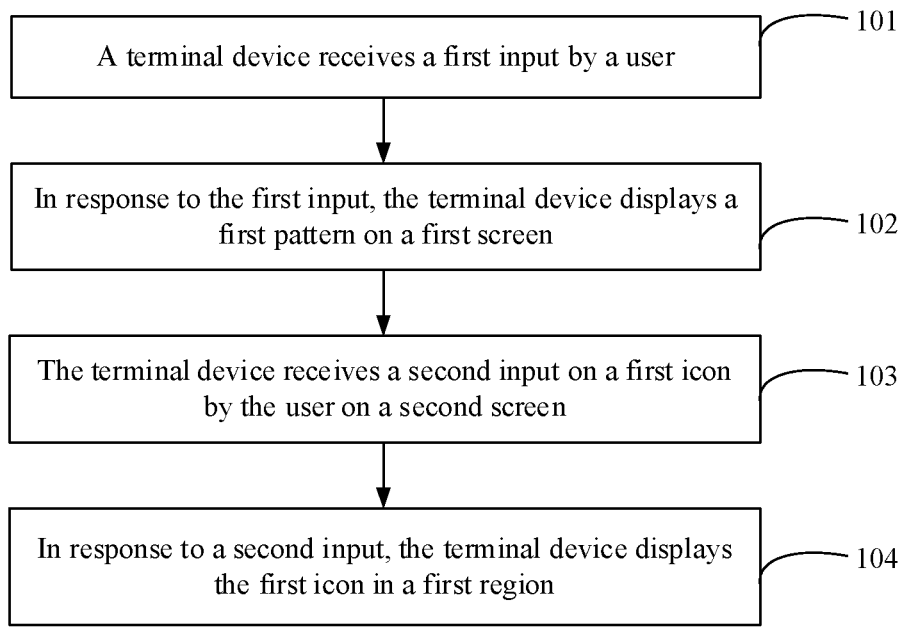
FIG. 2 is a first schematic diagram of an icon display method according to an embodiment of this disclosure.

As shown in FIG. 2, an embodiment of this disclosure provides an icon display method. The method can be applied to a terminal device including a first screen and a second screen. The method may include the following steps 101 to 104.

Step 101: The terminal device receives a first input by a user.

It should be noted that the terminal device provided in this embodiment of this disclosure may include two screens or more than two screens. In a case that the terminal device includes more than two screens, the first screen and the second screen are any two screens of the more than two screens. This may be determined based on an actual use requirement, and is not limited in this embodiment of this disclosure.

Optionally, in this embodiment of this disclosure, the first screen and the second screen of the terminal device may be two separate screens, and the first screen and the second screen may be connected by a shaft, a hinge, or the like; or the first screen and the second screen of the terminal device may be two separate screens, the first screen may be a front screen of the terminal device, and the second screen may be a rear screen of the terminal device; or a screen of the terminal device may be a flexible screen, and the flexible screen may be folded into at least two screens, such as a first screen and a second screen.

Optionally, in this embodiment of this disclosure, the first input may be a touch input on the first screen. Such touch input may be a tap input, a slide input, a double-tap input, a touch-and-hold input, or the like on the first screen.

For example, the first input being a slide input on the first screen by the user is used as an example for description. In the process of using the terminal device by the user, if the user wants to move an icon from the second screen to a region (the region may be a region in which at least one icon position is located) of the first screen for display, the user may slide a finger along an edge of the region, so that the terminal device can receive the slide input (namely, the first input) by the user and perform the following step 102.

For example, the first input being a tap input on the first screen by the user is used as an example for description. In the process of using the terminal device by the user, if the user wants to move an icon from the second screen to an icon position of the first screen for display, the user may tap the icon position, so that the terminal device can receive the tap input (namely, the first input) by the user and perform the following step 102.

Step 102: In response to the first input, the terminal device displays a first pattern on the first screen.

The first pattern may be used for selecting a first region, and the first region may be a region in which the first input is located.

Optionally, in this embodiment of this disclosure, after the terminal device receives the first input, the terminal device may first determine the first region of the first screen based on the first input, and then display the first pattern on the first screen.

Figure 4A:
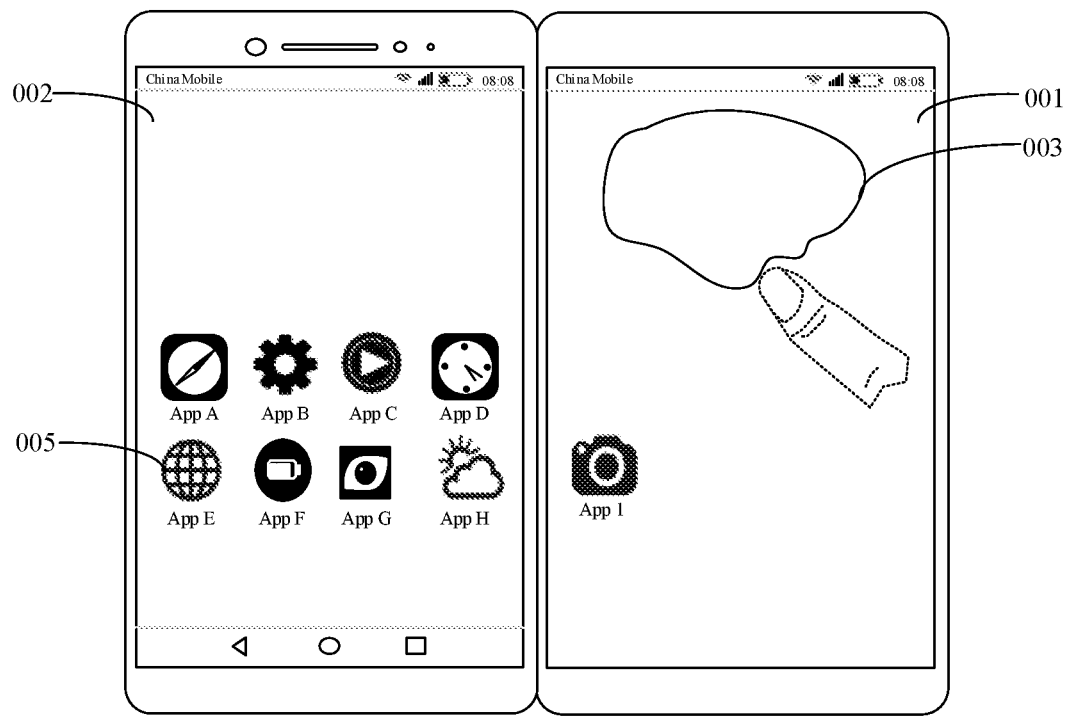
FIG. 4A is a first schematic diagram of displaying a pattern and an icon according to an embodiment of this disclosure.

For example, as shown in FIG. 4A, the terminal device may include a first screen 001 and a second screen 002. In the process of using the terminal device by the user, if the user wants to move an icon from the second screen 002 to a first region of the first screen 001 for display, the user may slide a finger along an edge of the first region, so that the terminal device can receive the slide input (namely, the first input) by the user, and in response to the first input, displays, on the first screen 001, the first pattern 003 used for selecting the first region.

Figure 3A:
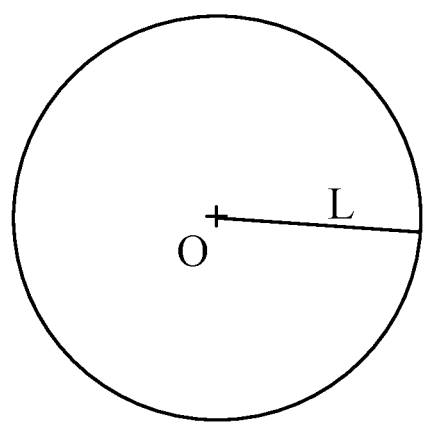
FIG. 3A is a first schematic diagram of three types of first patterns according to an embodiment of this disclosure.
Figure 3B:
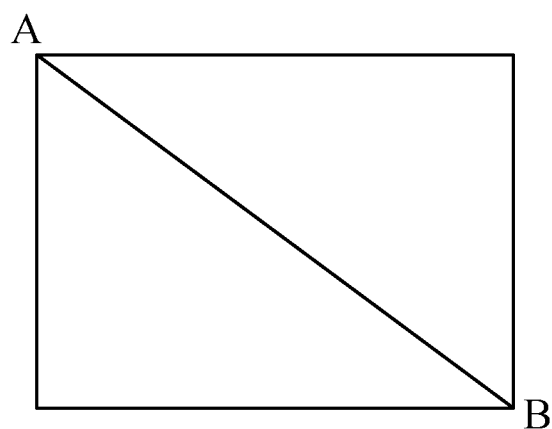
FIG. 3B is a second schematic diagram of three types of first patterns according to an embodiment of this disclosure.
Figure 3C:
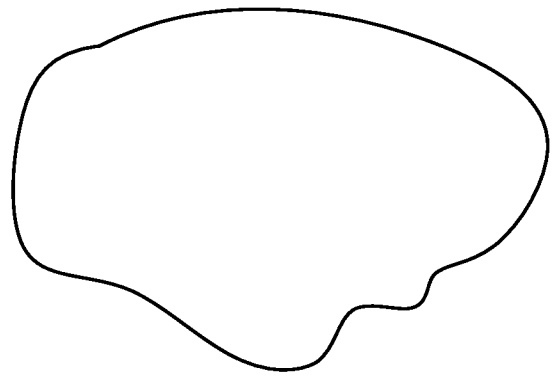
FIG. 3C is a third schematic diagram of three types of first patterns according to an embodiment of this disclosure.

It should be noted that a shape of the first pattern is not specifically limited in this embodiment of this disclosure. For example, as shown in FIG. 3A, the first pattern may be a circle; as shown in FIG. 3B, the first pattern may be a rectangle; as shown in FIG. 3C, the first pattern may be an irregular pattern. Certainly, the first pattern may alternatively be of any other possible shapes, and may be determined based on an actual use requirement, and is not limited in this embodiment of this disclosure.

Optionally, in this embodiment of this disclosure, if the first input is a tap input, the first region may be a circular region with a center being a tap position O of the first input and a radius being a preset length L, as shown in FIG. 3A. If the first input is a slide input, the first region may be a rectangular region with a diagonal line connecting a start point A and an end point B of the first input, as shown in FIG. 3B. If the first input is a slide input, the first region may be a region enclosed by an irregular pattern that is formed by a track of the slide input, as shown in FIG. 3C.

Step 103: The terminal device receives a second input on a first icon by the user on the second screen.

Optionally, in this embodiment of this disclosure, the first icon may be an icon of an application program, a folder icon, or the like. This may be determined based on an actual use requirement, and is not limited in this embodiment of this disclosure.

Optionally, in this embodiment of this disclosure, the first icon is one or more icons.

Optionally, in this embodiment of this disclosure, the second input may be a touch input on the first icon on the second screen. The touch input may be a tap input, a slide input, a double-tap input, a touch-and-hold input, or the like.

For example, if the first icon on the second screen is one icon, the second input may be a tap input, a double-tap input, a touch-and-hold input, or a drag input on the one icon. If the first icon on the second screen is a plurality of icons, the second input may be a slide-to-circle input on the plurality of icons.

Step 104: In response to the second input, the terminal device displays the first icon in the first region.

Figure 4B:
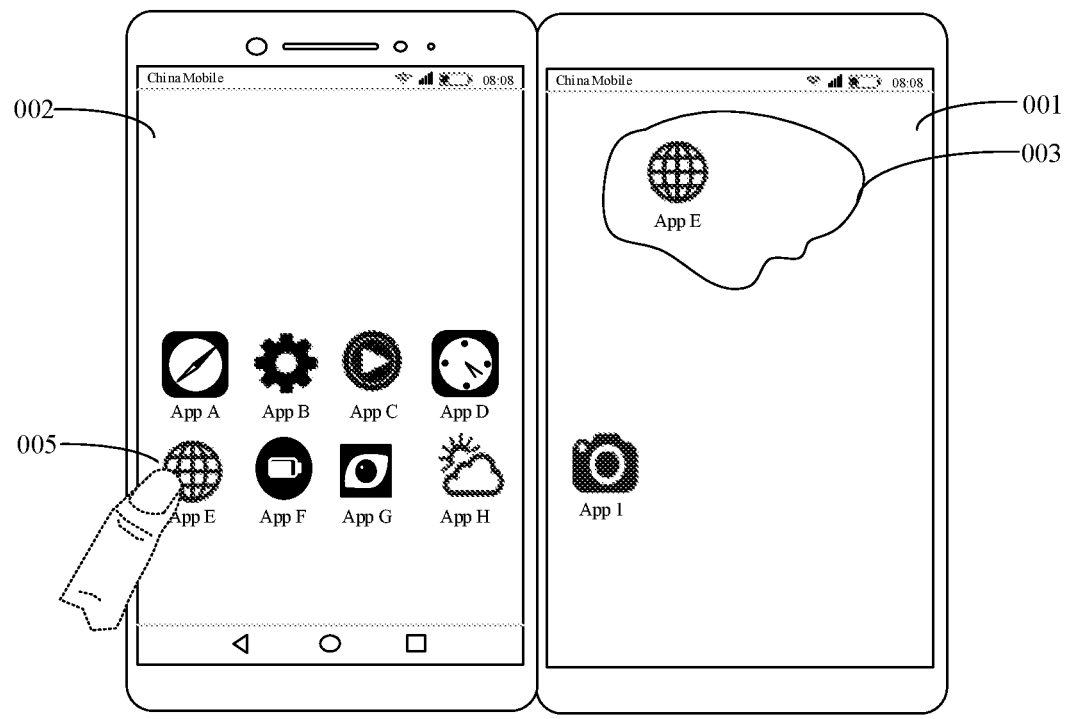
FIG. 4B is a second schematic diagram of displaying a pattern and an icon according to an embodiment of this disclosure.

For example, in a case that the terminal device displays the first pattern 003, shown in FIG. 4A, on the first screen in response to the first input, if the user wants to move an icon 005 (namely, the first icon) of an "App E" from the second screen 002 to the first region of the first screen, the user may tap the icon 005 of the "App E". As shown in FIG. 4B, the terminal device may receive a tap input (namely, the second input) on the icon 005 of the "App E" by the user, and in response to the tap input, the icon 005 of the "App E" is displayed in the first region selected by the first pattern 003.

It should be noted that, in this embodiment of this disclosure, after the foregoing step 104, the terminal device may cancel display of the first icon on the second screen, or skip canceling display of the first icon on the second screen (that is, the first icon is still displayed on the second screen). This may be determined based on an actual use requirement, and is not specifically limited in this embodiment of this disclosure.

This embodiment of this disclosure provides an icon display method. The first input by the user may be received; in response to the first input, the first pattern (the first pattern is used for selecting the first region, and the first region is a region in which the first input is located) is displayed on the first screen; the second input on the first icon by the user on the second screen is received; and in response to the second input, the first icon is displayed in the first region. According to this solution, the user can trigger the terminal device through the first input to select the first region on the first screen; therefore, in a case that the first region is in a selected state, the user can move at least one icon from the second screen to the first region of the first screen through the second input. In this way, the user can quickly move at least one icon from one screen to a user-specified region of another screen, with no need to perform a plurality of operations such as drag and confirm, thereby simplifying an operation process of moving an icon between different screens.

Figure 5:
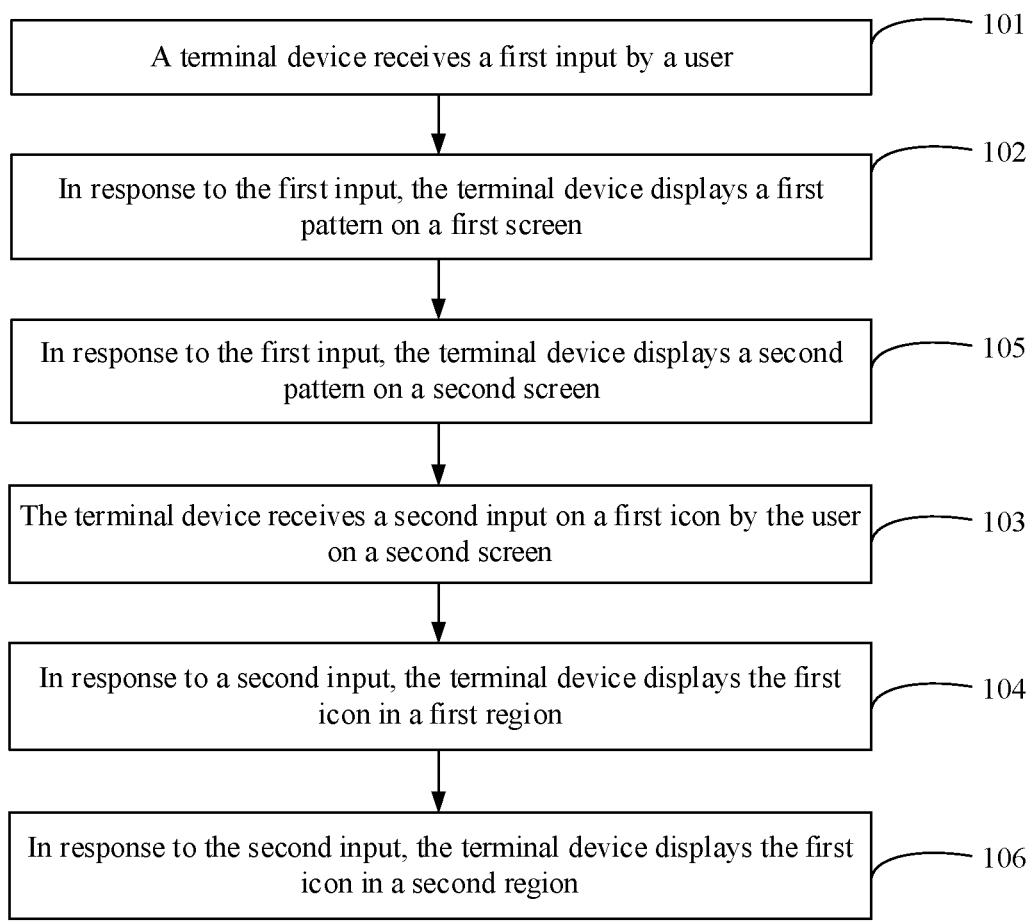
FIG. 5 is a second schematic diagram of an icon display method according to an embodiment of this disclosure.

Optionally, with reference to FIG. 2, as shown in FIG. 5, after the foregoing step 101, the icon display method provided in this embodiment of this disclosure may further include the following step 105. In addition, after the foregoing step 103, the icon display method provided in this embodiment of this disclosure may further include the following step 106.

Step 105: In response to the first input, the terminal device displays a second pattern on the second screen.

The second pattern may be used for selecting a second region. A position of the second region on the second screen is associated with a position of the first region on the first screen.

It should be noted that an example in which the terminal device first performs step 102 and then performs step 105 is used for description in FIG. 5 in this embodiment of this disclosure, and this does not constitute any limitation on this embodiment of this disclosure. It can be understood that, in actual implementation, the terminal device may alternatively first perform step 105 and then perform step 102; or may perform step 102 and step 105 simultaneously.

Optionally, in this embodiment of this disclosure, the position of the second region on the second screen being associated with the position of the first region on the first screen may include: there is a mapping relationship between the position of the second region on the second screen and the position of the first region on the first screen; or there is a mirroring relationship between the position of the second region on the second screen and the position of the first region on the first screen.

It should be noted that in this embodiment of this disclosure, the mapping relationship means that the position of the second region on the second screen is mapped to the position of the first region on the first screen; the mirroring relationship means that the position of the second region on the second screen is a mirror image of the position of the first region on the first screen.

Optionally, in this embodiment of this disclosure, a shape of the second pattern is the same as a shape of the first pattern. For example, the shape of the second pattern and the shape of the first pattern may each be a circle shown in FIG. 3A, or a rectangle shown in FIG. 3B, or an irregular shape shown in FIG. 3C.

Optionally, in this embodiment of this disclosure, a size of the second pattern may be the same as or different from a size of the first pattern. For example, in a case that a size of the first screen of the terminal device is the same as a size of the second screen, the size of the second pattern is the same as the size of the first pattern. In a case that the size of the first screen of the terminal device is different from the size of the second screen, the size of the second pattern may be the same as or different from the size of the first pattern.

Optionally, in this embodiment of this disclosure, a line type of the second pattern may be the same as or different from a line type of the first pattern. The line type of the second pattern may be a dashed line, and the line type of the first pattern may be a solid line; or the line type of the second pattern and the line type of the first pattern may each be a solid line.

Optionally, in this embodiment of this disclosure, a color of the second pattern may be the same as or different from a color of the first pattern. For example, the color of the second pattern may be a first color, and the color of the first pattern may be a second color; or the color of the second pattern and the color of the first pattern may each be a second color.

Figure 6:
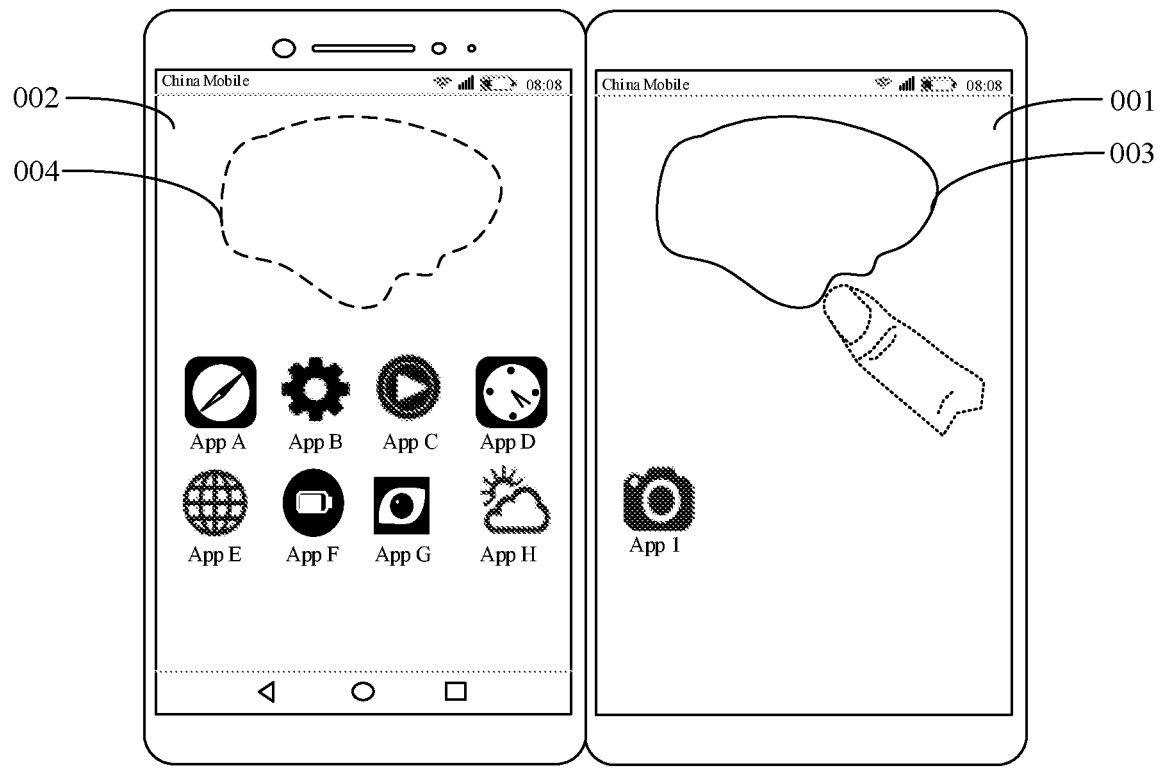
FIG. 6 is a schematic diagram of displaying a pattern according to an embodiment of this disclosure.

For example, as shown in FIG. 6, the terminal device may include a first screen 001 and a second screen 002. In the process of using the terminal device by the user, if the user wants to move an icon from the second screen 002 to a first region of the first screen 001 for display, the user may slide a finger along an edge of the first region, so that the terminal device can receive the slide input (namely, the first input) by the user, and in response to the first input, displays a first pattern 003 on the first screen 001 and displays a second pattern 004 on the second screen 002. A shape of the first pattern 003 is the same as a shape of the second pattern 004, and a size of the first pattern 003 is the same as a size of the second pattern 004.

Step 106: In response to the second input, the terminal device displays the first icon in the second region.

It should be noted that an example in which the terminal device first performs step 104 and then performs step 106 is used for description in FIG. 5 in this embodiment of this disclosure, and this does not constitute any limitation on this embodiment of this disclosure. It can be understood that, in actual implementation, the terminal device may alternatively first perform step 106 and then perform step 104; or may perform step 104 and step 106 simultaneously.

Figure 7:
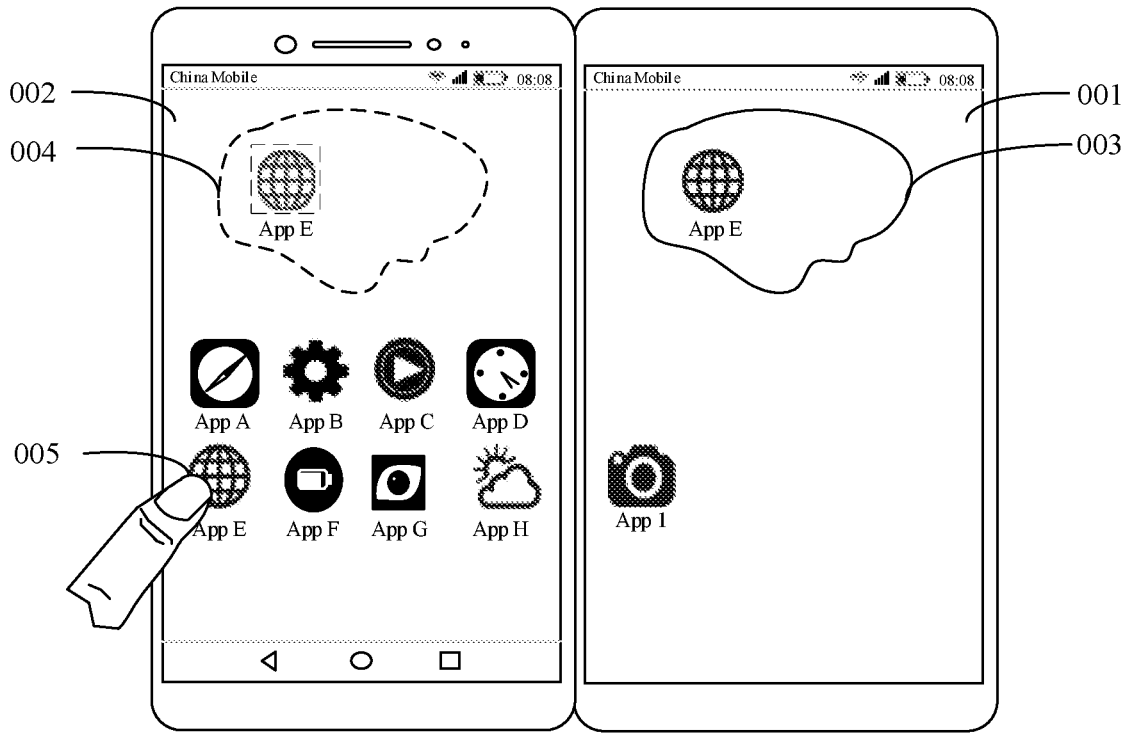
FIG. 7 is a schematic diagram of displaying an icon according to an embodiment of this disclosure.

For example, in a case that the terminal device displays a screen shown in FIG. 6 in response to the first input (that is, the first pattern 003 is displayed on the first screen 001, and the second pattern 004 is displayed on the second screen 002), as shown in FIG. 7, if the user taps the icon 005 (namely, the first icon) of the "App E" on the second screen 002, the terminal device may display, in response to the tap input (namely, the second input), the icon 005 of the "App E" in the first region selected by the first pattern 003 and the icon 005 of the "App E" in the second region selected by the second pattern 004.

In the icon display method provided in this embodiment of this disclosure, the terminal device can display, in response to the first input by the user, the first pattern for selecting the first region of the first screen and the second pattern for selecting the second region of the second screen; and the position of the second region on the second screen is associated with the position of the first region on the first screen. Therefore, in a case that it is inconvenient for the user to view content displayed on the first screen, the user may preview, by using the second pattern on the second screen, a position to which a to-be-moved icon can be moved, and determine whether to move the to-be-moved icon to the position. This can facilitate preview of a display position of a moved icon by the user on the second screen.

Figure 8:
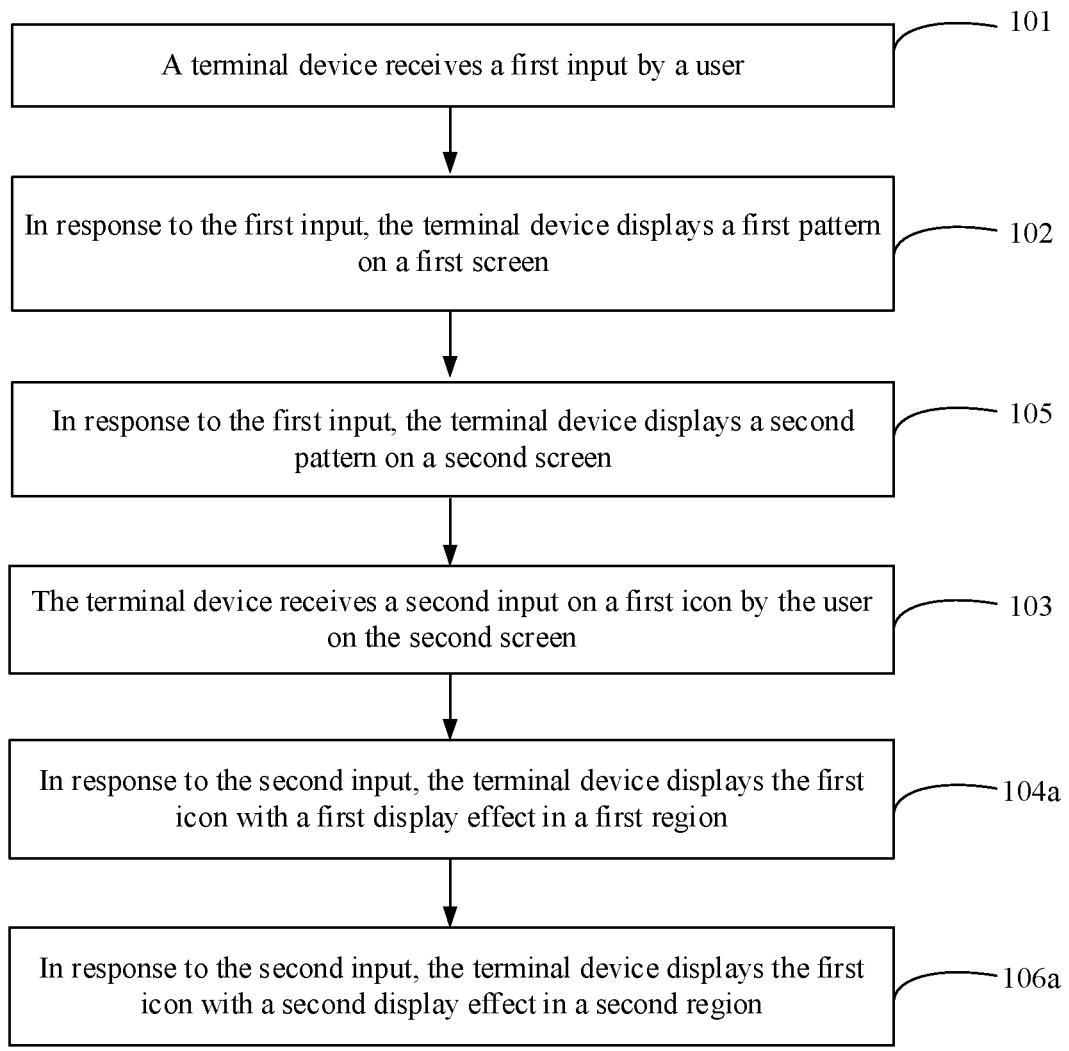
FIG. 8 is a third schematic diagram of an icon display method according to an embodiment of this disclosure.

Optionally, with reference to FIG. 5, as shown in FIG. 8, the foregoing step 104 may be implemented by the following step 104*a*, and the foregoing step 106 may be implemented by the following step 106*a*.

Step 104*a* In response to the second input, the terminal device displays the first icon with a first display effect in the first region.

Step 106*a* In response to the second input, the terminal device displays the first icon with a second display effect in the second region.

It should be noted that, for related descriptions of the second input, the first region, the second region, and the first icon, reference may be made to related descriptions in the foregoing embodiments and details are not repeated herein.

Optionally, in this embodiment of this disclosure, the first display effect and the second display effect may be different display effects. At least one of the following may be included: different line types of icons, different line thicknesses of the icons, different filling colors of the icons, different transparency of the icons, different shapes of the icons, or different sizes of the icons. This may be determined based on an actual use requirement, and is not limited in this embodiment of this disclosure.

For example, FIG. 7 is still used as an example for exemplary description. As shown in FIG. 7, after the terminal device receives the second input from the user, the terminal device may display, in response to the second input, the icon 005 (namely, the first icon) of the "App E" with 100% transparency in the first region selected by the first pattern 003, and display the icon 005 of the "App E" with 50% transparency in the second region selected by the second pattern 004.

In the icon display method provided in this embodiment of this disclosure, because the terminal device can display the first icon with different display effects in two regions of the two screens, the user can distinguish different regions based on different display effects. For example, if the first display effect is a solid line and the second display effect is a dashed line, the user can learn that the first region of the first screen is a region, to which the icon is actually moves, on the screen, and the second region of the second screen is a region for reference for the user and is not a region, to which the icon is actually moves, on the screen. In this way, the user can learn about the first region being an actual moved-to region and the second region being a reference region, and determines, based on actual usage requirements, whether to cancel display of the first icon in the second region.

Optionally, in this embodiment of this disclosure, after the foregoing step 106*a*, the icon display method provided in this embodiment of this disclosure further includes the following step 107 and step 108.

Step 107: The terminal device receives a third input by the user.

Optionally, in this embodiment of this disclosure, the third input may be a touch input, a key input, a voice input, a gesture input, or the like. For example, the touch input may be a slide input on the second pattern by the user on the second screen, or a tap input on a cancel control by the user on the second screen. The key input may be a press input on a volume key by the user. The voice input may be voice content "cancel display of the second pattern" input by the user. The gesture input may be a characteristic gesture input by the user.

Step 108: In response to the third input, the terminal device cancels display of the first pattern, remains display of the first icon with the first display effect in the first region, and cancels display of the second pattern and display of the first icon in the second region.

Figure 9A:
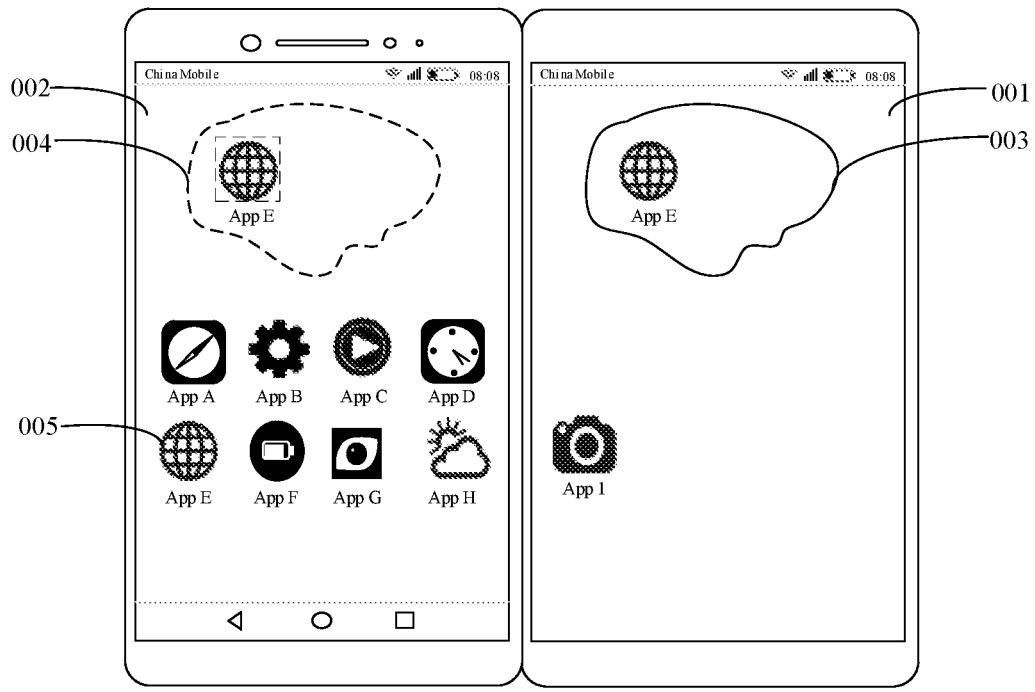
FIG. 9A is a first schematic diagram of canceling display of a pattern and an icon according to an embodiment of this disclosure.
Figure 9B:
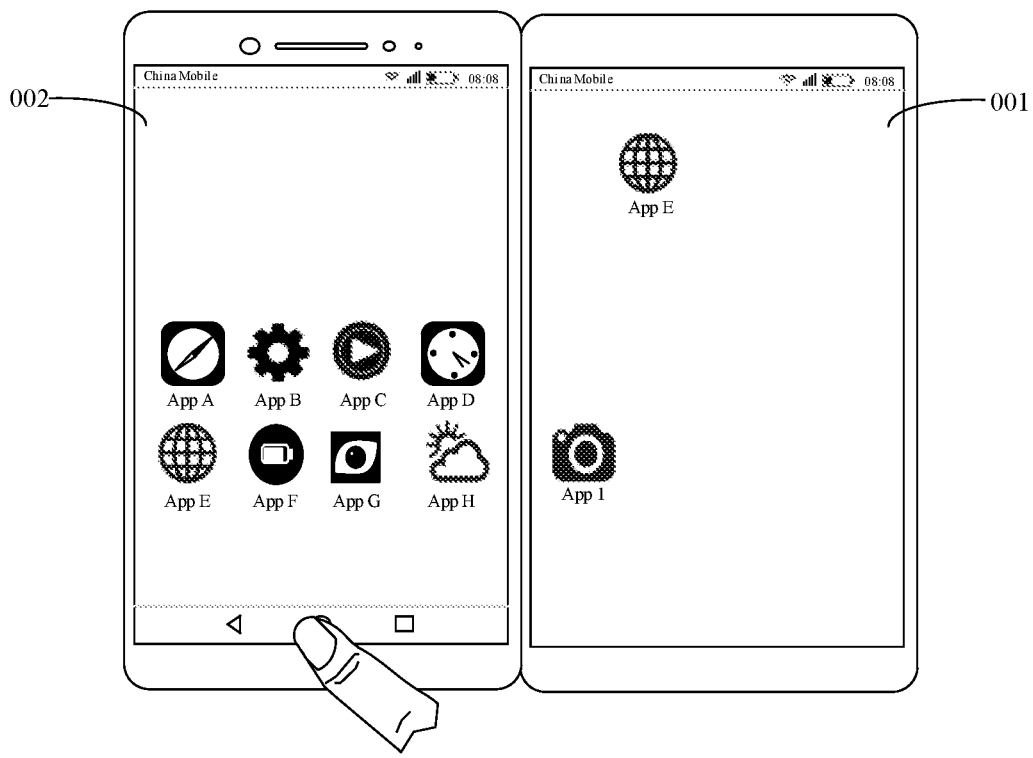
FIG. 9B is a second schematic diagram of canceling display of a pattern and an icon according to an embodiment of this disclosure.

For example, as shown in FIG. 9A, the terminal device may display the icon (namely, the first icon) of the "App E" with the first display effect in the first region selected by the first pattern 003 on the first screen 001, and display the icon of the "App E" with the second display effect (which is a display effect of a dashed frame shown in FIG. 9A) in the second region selected by the second pattern 004 on the second screen 002. As shown in FIG. 9B, if the terminal device receives a press input (namely, the third input) on a Home button by the user, the terminal device may remain, in response to the press input, display of the icon of the "App E" with the first display effect on the first screen 001, cancel display of the first pattern, and cancel the second pattern on the second screen 002 and the icon of the "App E" displayed in the second region.

In the icon display method provided in this embodiment of this disclosure, after the user has completed the process of moving an icon between different screens, because the user does not need to view the second pattern and the first icon in the second region, the user can trigger, through the third input, the terminal device to remain display of the first icon on the first screen, cancel display of the second pattern on the second screen and display of the first icon in the second region, and cancel display of the first pattern, so as to prevent the second pattern and the first icon from still occupying a display region of the second screen and prevent the first pattern from still occupying a display region of the first screen, thereby facilitating other possible operations by the user.

Optionally, in this embodiment of this disclosure, after the foregoing step 101, the icon display method provided in this embodiment of this disclosure may further include the following step 109. In addition, after the foregoing step 103, the icon display method provided in this embodiment of this disclosure may further include the following step 110.

Step 109: The terminal device determines a target value.

The target value may be a maximum number of icons allowed to be displayed in the first region.

It should be noted that an execution order of the foregoing step 109 and step 102 is not limited in this embodiment of this disclosure. For example, the terminal device may first perform step 109 and then perform step 102; or may first perform step 102 and then perform step 109; or may perform step 102 and step 109 simultaneously.

Optionally, in this embodiment of this disclosure, a method for determining the target value by the terminal device may include: determining the first region based on the first input; obtaining the number N of icon positions covered by the first region, where N is a positive integer; and determining N as the target value. It can be understood that when a region in which one icon position is located does not fully belong to the first region, the one icon position cannot be used as an icon position covered by the first region.

Step 110: When the number of icons in the first region reaches the target value, the terminal device outputs first information.

The first information may be used for prompting the user that an icon cannot be moved to the first region.

It should be noted that the foregoing step 109 and step 110 are a possible implementation provided in this embodiment of this disclosure, and do not constitute any limitation on this embodiment of this disclosure. Another possible implementation provided in this embodiment of this disclosure is: the terminal device determines the target value, and displays an icon and a first control in the first region; and when the number of icons in the first region reaches the target value, updates the icon in the first region if an input on the first control by the user is received.

For example, it is assumed that the target value is 2, and an icon A, an icon B, and the first control are displayed in the first region. If the input on the first control is received, the icon A and the icon B in the first region are updated to an icon C and an icon D.

Optionally, in this embodiment of this disclosure, the first information may be voice information or text information. Certainly, the first information may alternatively be any other information capable of prompting the user, for example, the preset number of times of vibration of the terminal device or change of a color of a moved icon. This is not limited in this embodiment of this disclosure, and may be determined based on an actual use requirement.

Figure 10A:
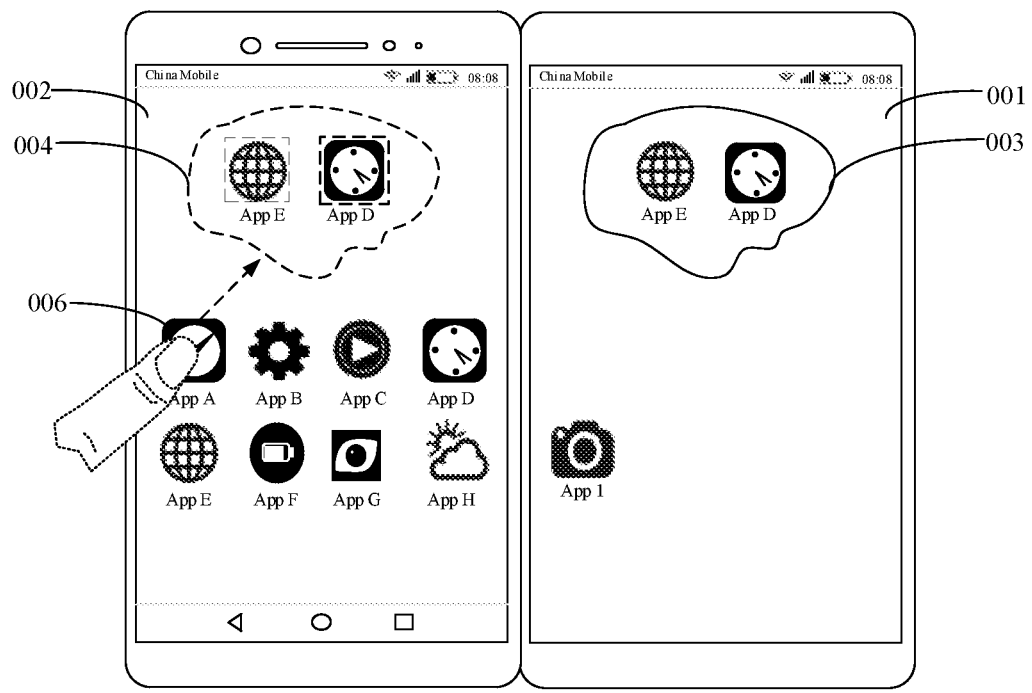
FIG. 10A is a first schematic diagram of displaying prompt information according to an embodiment of this disclosure.
Figure 10B:
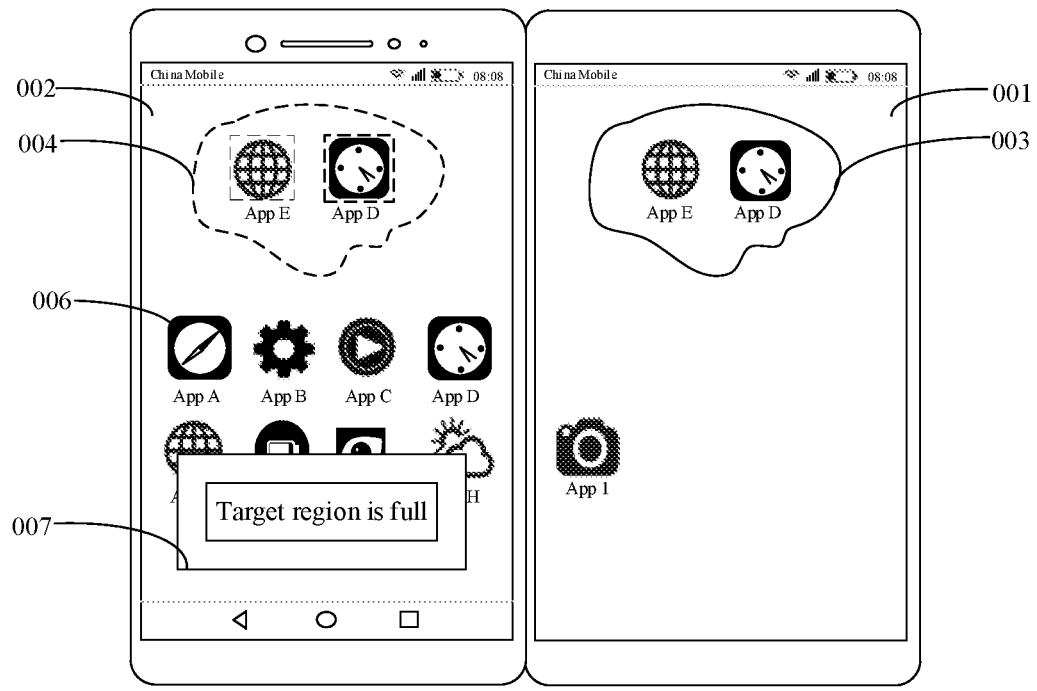
FIG. 10B is a second schematic diagram of displaying prompt information according to an embodiment of this disclosure.

For example, it is assumed that the maximum number (namely, the target value) of icons allowed to be displayed in the first region selected by the first pattern 003 shown in FIGS. 10A and 10B is 2. As shown in FIG. 10A, in a case that the icon of the "App E" and an icon of an "App D" are already displayed in the first region, if the user wants to move an icon of an "App A" from the second screen 002" to the first region, the user may touch and hold the icon 006 of the "App A", and drag the icon of the "App A" to the second region along a dashed-line direction. In this case, the terminal device may receive the drag input by the user, and detect whether the number of icons in the first region reaches the target value, and in a case that it is determined that the number of icons in the first region reaches the target value, display indication information "Target region is full" 007 (that is, the first information) shown in FIG. 10B. In this way, the user may give up moving the icon 006 of the "App A" to the first region.

In the icon display method provided in this embodiment of this disclosure, because the terminal device can prompt the user in a case that the maximum number of icons allowed to be displayed in the first region reaches the target value, the user can learn that an icon can be no longer moved to the first region, and therefore does not perform the operation of moving the icon to the first region, thereby improving user experience.

Optionally, in this embodiment of this disclosure, the first region is one icon display position. The foregoing step 104 may be implemented by the following step 104b or step 104c.

Step 104b: If the first region is a blank region, display the first icon in the first region.

Figure 11A:
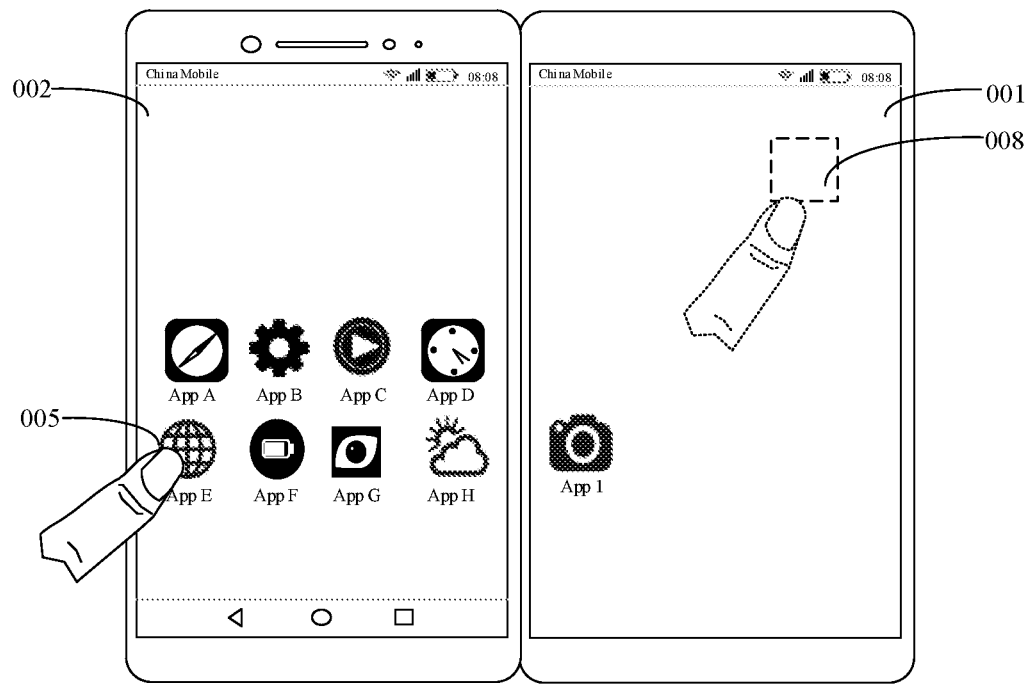
FIG. 11A is a first schematic diagram of displaying an icon in a blank region according to an embodiment of this disclosure.
Figure 11B:
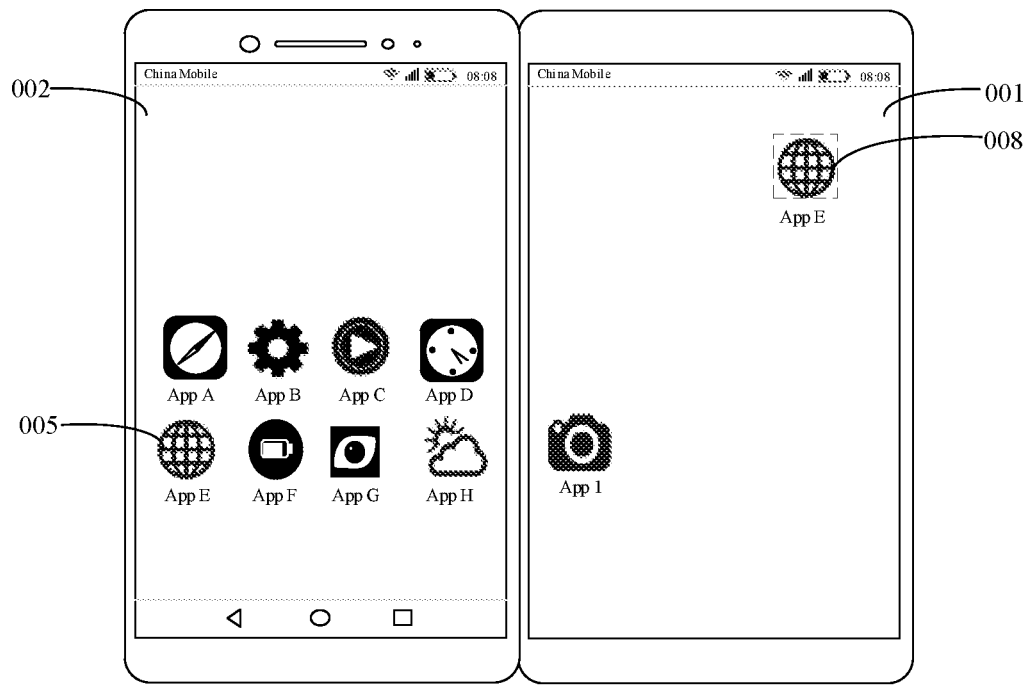
FIG. 11B is a second schematic diagram of displaying an icon in a blank region according to an embodiment of this disclosure.

For example, as shown in FIG. 11A, if the user taps a position in which a blank region 008 is located on the first screen 001, the terminal device may identify the blank region 008 by a dashed frame (namely, the first pattern). If the user wants to move the icon 005 of the "App E" from the second screen 002 to the position in which the blank region 008 is located, the user may tap the icon 005 of the "App E". As shown in FIG. 11B, in response to the tap input, the terminal device may display the icon (namely, the first icon) of the "App E" in the position (namely, the first region) in which the blank region 008 is located on the terminal device.

Step 104c: In a case that a second icon is displayed in the first region, display a folder icon in the first region.

The folder icon may include a first icon and a second icon.

Optionally, in this embodiment of this disclosure, the second icon may be an icon of an application program, a folder icon, or any other possible icons. This is not specifically limited in this embodiment of this disclosure, and may be determined based on an actual use requirement.

Optionally, in this embodiment of this disclosure, the terminal device displays the folder icon in the first region, which may include the following two possible implementations.

In a first possible implementation, if the second icon is an icon of one application program, one folder icon is displayed in the first region, and the folder icon includes the first icon and the second icon.

In a second possible implementation, if the second icon is an icon of one folder, the icon of the one folder is displayed in the first region, and the icon of the one folder includes the first icon.

Figure 12A:
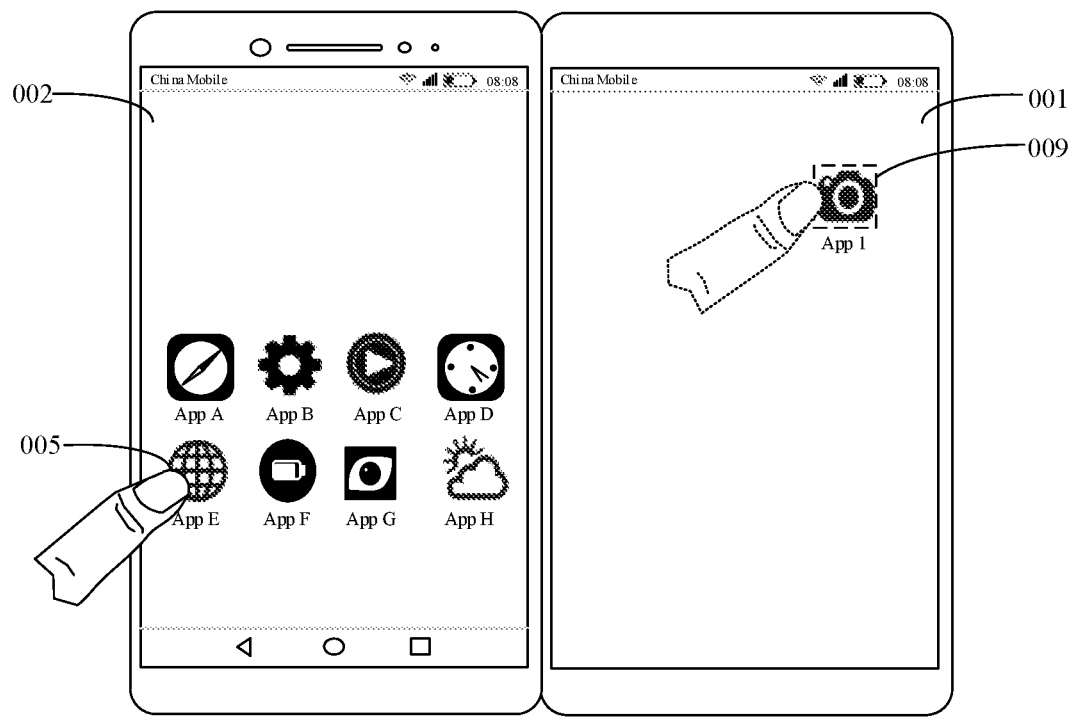
FIG. 12A is a first schematic diagram of displaying a folder in an icon position according to an embodiment of this disclosure.
Figure 12B:
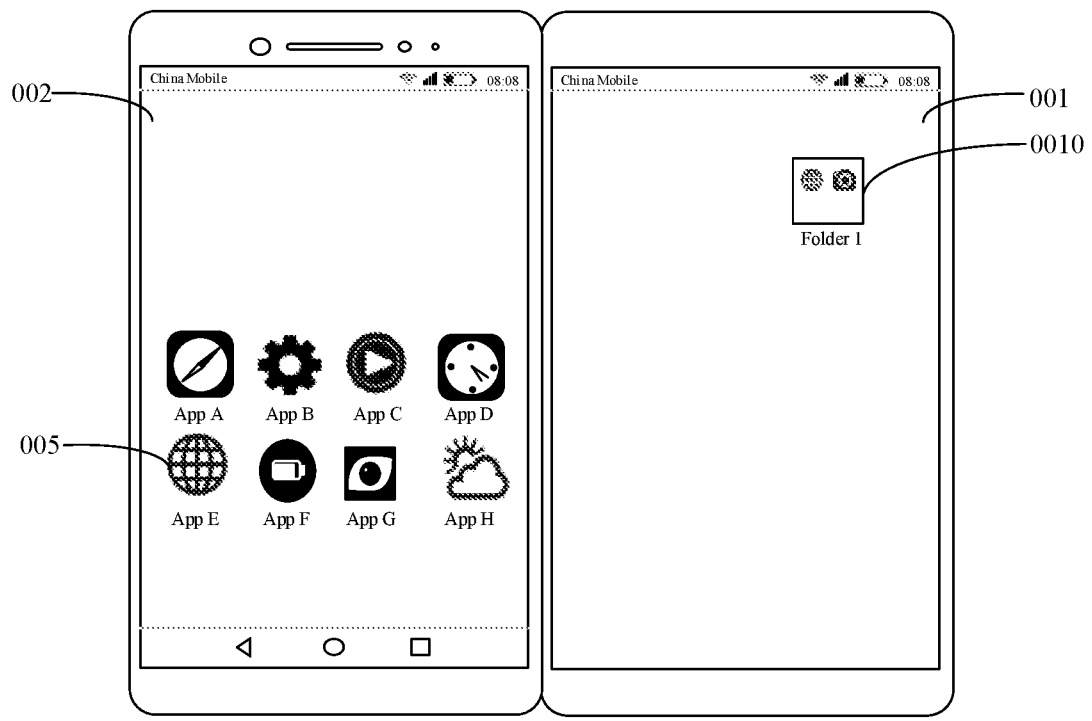
FIG. 12B is a second schematic diagram of displaying a folder in an icon position according to an embodiment of this disclosure.

For example, as shown in FIG. 12A, if the user taps an icon 009 of an "App 1" on the first screen 001, the terminal device may display a dashed frame (namely, the first pattern) surrounding the icon 009 of the "App 1". If the user wants to move the icon 005 of the "App E" from the second screen 002 to the dashed frame, the user may tap the icon 005 of the "App E". As shown in FIG. 12B, the terminal device may display, in response to the tap input, an icon 0010 (namely, the folder icon) of a "Folder 1" in the first region selected by the dashed frame. The icon 0010 of the "Folder 1" includes the icon of the "App 1" and the icon of the "App E".

In the icon display method provided in this embodiment of this disclosure, in a case that the first region selected by the user is a blank region or the second icon is displayed in the first region, the terminal device may display an icon in a different form in the first region. This can improve flexibility and diversity of displaying icons in the first region.

Optionally, after the foregoing step 104, the icon display method provided in this embodiment of this disclosure may further include the following step 111 and step 112.

Step 111: In a case that at least one icon is displayed in the first region, the terminal device receives a fourth input by the user.

The fourth input is used to set an aggregate display condition, and the aggregate display condition may be used for triggering display of the at least one icon in the first region of the first screen.

Optionally, in this embodiment of this disclosure, the fourth input may be an input on the first screen.

Optionally, in this embodiment of this disclosure, the fourth input may be a touch input, a key input, a voice input, a specific gesture input, or the like. This may be determined based on an actual use requirement, and is not specifically limited in the embodiments of this disclosure.

For example, the fourth input may be a select input on a target setting option. The target setting option may be used for setting a time of aggregate display, or for setting a position of aggregate display, or for setting an input of aggregate display.

Figure 13A:
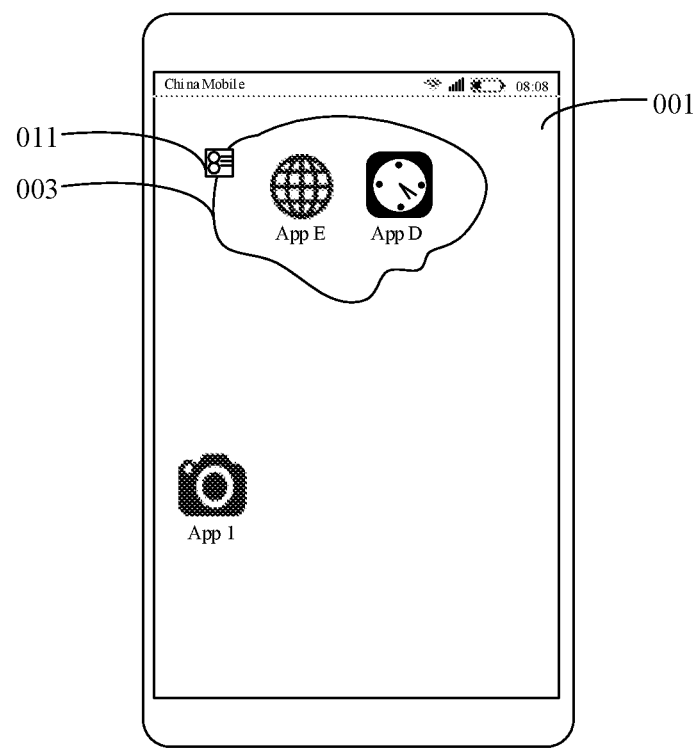
FIG. 13A is a first schematic diagram of an operation of setting an aggregate display condition by a user according to an embodiment of the disclosure.
Figure 13B:
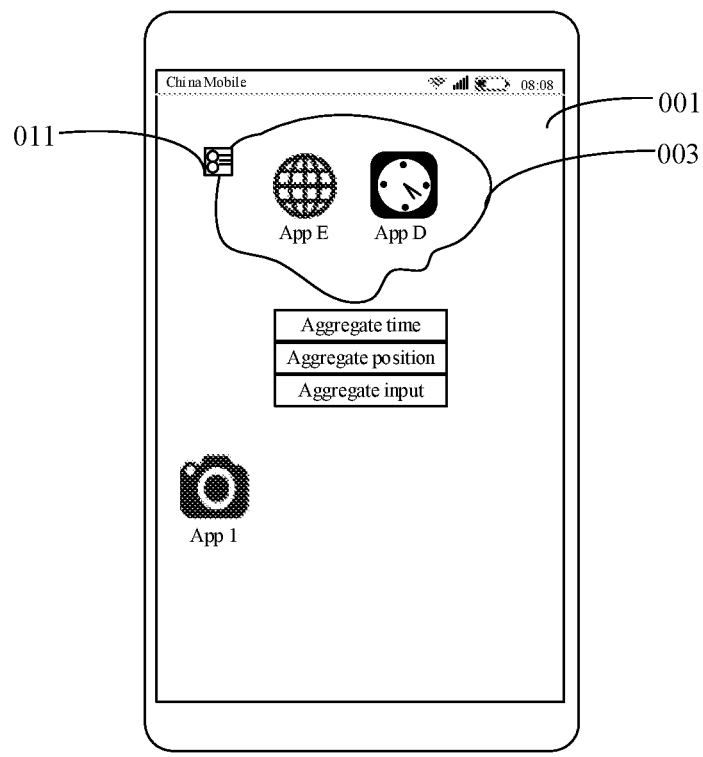
FIG. 13B is a second schematic diagram of an operation of setting an aggregate display condition by a user according to an embodiment of the disclosure.
Figure 13C:
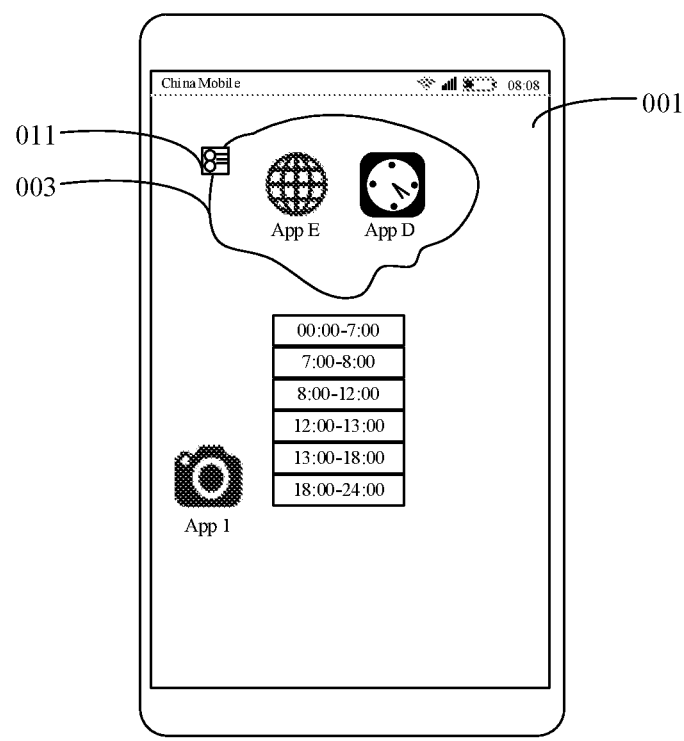
FIG. 13C is a third schematic diagram of an operation of setting an aggregate display condition by a user according to an embodiment of the disclosure.
Figure 13D:
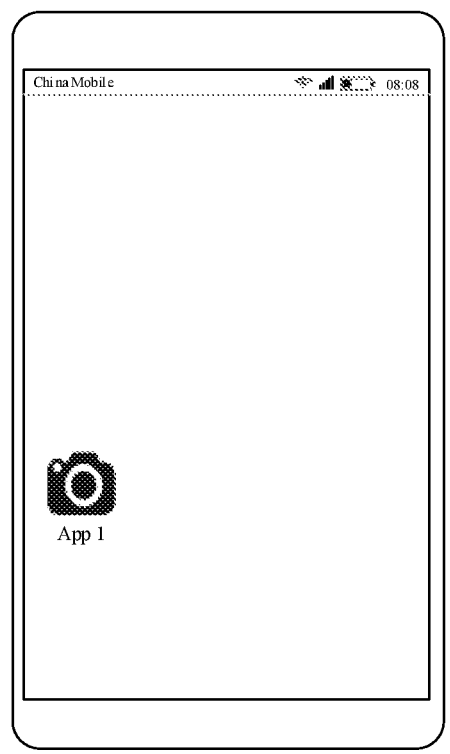
FIG. 13D is a fourth schematic diagram of an operation of setting an aggregate display condition by a user according to an embodiment of the disclosure.

For example, as shown in FIG. 13A, in a case that the at least one icon and the first pattern 003 are displayed in the first region of the first screen 001 of the terminal device, the user may touch and hold the first pattern 003, so as to trigger the terminal device to display a target control 011. If the user taps the target control 011, the terminal device may update a screen shown in FIG. 13A to a screen shown in FIG. 13B, and three options, namely "Aggregate time", "Aggregate position", and "Aggregate input", are displayed on the screen shown in FIG. 13B. If the user taps the option of "Aggregate time", the terminal device may update the screen shown in FIG. 13B to a screen shown in FIG. 13C, and six options, namely "00:00-7:00", "7:00-8:00", "8:00-12:00", "12:00-13:00", "13:00-18:00", and "18:00-24:00", are displayed on the screen shown in FIG. 13C. Then, if the user taps a sub-option "18:00-24:00" shown in FIG. 13C, the terminal device may update the screen shown in FIG. 13C to a screen shown in FIG. 13D. The updated screen shown in FIG. 13D does not include the at least one icon and the first pattern 003.

Step 112: When the terminal device meets the aggregate display condition, the terminal device displays the at least one icon in the first region, or the terminal device displays the first pattern on the first screen and displays the at least one icon in the first region.

Optionally, the aggregate display condition may include any one of the following (a) to (d).

(a) A system time of the terminal device belongs to a preset time period.

In this embodiment of this disclosure, the preset time period may be a specific time segment set by the user.

For example, it is assumed that the aggregate display condition is that the system time of the terminal device belongs to a preset time period, where the preset time period is "18:00-24:00" and a preset periodicity is 5 minutes. The terminal device may monitor every 5 minutes whether the system time of the terminal device falls within "18:00-24:00". If it is detected to be within "18:00-24:00", the terminal device may display the at least one icon in the first region; or the terminal device may display the first pattern on the first screen and display the at least one icon in the first region.

It can be understood that in a case that the aggregate display condition set by the user is that the system time of the terminal device belongs to the preset time period, the terminal device automatically detects whether the system time falls within the preset time period, so that the terminal device can automatically aggregate and display a plurality of icons in a case that the system time falls within the preset time period.

(b) A location at which the terminal device is located is a preset location.

In this embodiment of this disclosure, the preset location may be a location set by the user.

Optionally, in this embodiment of this disclosure, the preset location may be any one of the following: home, school, work place, travel destination, or the like. This may be determined based on a use requirement, and is not specifically limited in this embodiment of this disclosure.

For example, it is assumed that the aggregate display condition is that the location of the terminal device is a preset location, where the preset location is "home", and the preset periodicity is 5 minutes. The terminal device may monitor every 5 minutes whether the location of the terminal device is the preset location. If it is detected to be at the preset location, the terminal device may display the at least one icon in the first region; or the terminal device may display the first pattern on the first screen and display the at least one icon in the first region.

It can be understood that in a case that the aggregate display condition set by the user is that the location of the terminal device is the preset location, the terminal device automatically detects whether the location of the terminal device is the preset location, so that the terminal device can automatically aggregate and display a plurality of icons in a case that the location of the terminal device is the preset location.

(c) The terminal device receives a fifth input by the user, where an input track of the fifth input matches the first pattern.

Optionally, in this embodiment of this disclosure, the fifth input may be that a track drawn by the user on the first screen matches the first pattern.

It should be noted that the input track matching the first pattern means that a drawing region of the input track is in a specified region, and a pattern of the input track has the same shape and similar size as the first pattern.

For example, it is assumed that the aggregate display condition is that the fifth input by the user is received by the terminal device, where the input track of the fifth input matches the first pattern, and the first pattern is a target rectangle. If the terminal device receives one slide input (namely, the fifth input) by the user on the first screen, an input track of the slide input on the first screen is a rectangle, and the rectangle matches the target rectangle, the terminal device may display the at least one icon in the first region, or display the first pattern on the first screen and display the at least one icon in the first region.

It can be understood that in a case that the terminal device receives the fifth input by the user, where the input track of the fifth input matches the first pattern, the user can draw, based on an actual use requirement in some cases, a track matching the first pattern, so as to trigger the terminal device to aggregate and display a plurality of icons.

(d) Preset target information indicates a target event, where the target information may include at least one preset type of first information for the terminal device, or the target information includes second information input by the user.

Optionally, in this embodiment of this disclosure, the target event may be any one of the following: business trip, work, vacation, travel, and the like. This may be determined based on an actual use requirement, and is not limited in this embodiment of this disclosure.

Optionally, in this embodiment of this disclosure, the first information may be information obtained by the terminal device and used for indicating the target event, or information obtained by the terminal device and associated with the target event.

For example, a note, a schedule, or the like may be stored in the terminal device. The terminal device may perform content detection on the note, the schedule, or the like. If related information such as travel time, travel location, business travel item, or business travel arrangement is detected (that is, the first information is obtained), the terminal device may display the at least one icon in the first region; or the terminal device may display the first pattern on the first screen and display the at least one icon in the first region.

For example, in a case that wallpaper or screen saver displayed on the terminal device is a preset picture, a type of text language displayed on the terminal device is a preset language type, an operating mode of the terminal device is a preset operating mode, and an application program running on the terminal device is a preset application program, the terminal device may determine that such information is associated with the target event. In this case, the terminal device may display the at least one icon in the first region; or the terminal device may display the first pattern on the first screen and display the at least one icon in the first region.

Optionally, in this embodiment of this disclosure, the second information may be information input by the user and used for indicating the target event.

For example, if the user enters "vacation" in a given input region of the terminal device, the terminal device may display the at least one icon in the first region; or the terminal device may display the first pattern on the first screen and display the at least one icon in the first region.

It can be understood that in a case that the aggregate display condition set by the user is that the preset target information indicates the target event, detection is performed on information included in the terminal device or information input by the user, so that the target event is determined in a case that the at least one preset type of first information is included in the terminal device or the second information is input by the user, so as to aggregate and display a plurality of icons.

Optionally, after the foregoing step 111, the icon display method provided in this embodiment of this disclosure further includes: in response to the fourth input, the terminal device cancels display of the at least one icon in the first region.

Optionally, if the first pattern is still displayed in the first region when the fourth input is received, the icon display method provided in this embodiment of this disclosure further includes: in response to the fourth input, the terminal device cancels display of the first pattern.

Optionally, before the foregoing step 112, the icon display method provided in this embodiment of this disclosure further includes: the terminal device periodically monitors based on the preset periodicity whether the terminal device meets the aggregate display condition.

Optionally, the preset periodicity may be a detection periodicity automatically set by the terminal device or a detection periodicity set by the user, and may be determined based on an actual use requirement.

It should be noted that if the terminal device detects that the aggregate display condition is not met, the terminal device may continue to periodically monitor based on the preset periodicity whether the terminal device meets the aggregate display condition.

According to the icon display method provided in this embodiment of this disclosure, based on an actual use requirement (for example, the user wants to use at least one icon in a specific time period, or wants to use at least one icon at a specific location, or wants to use at least one icon for doing something), the user can set an aggregate display condition that triggers display of the at least one icon in the first region of the first screen. Therefore, the at least one icon can be aggregated and displayed again in the first region in a case that the terminal device meets the aggregate display condition.

Optionally, in a case that the aggregate display condition includes the fifth input by the user being received and the input track of the fifth input matching the first pattern, the foregoing step 112 may be implemented by the following steps 112a and 112b.

Step 112a: The terminal device receives the fifth input by the user.

Optionally, in this embodiment of this disclosure, the fifth input may be a touch input, a key input, a voice input, a specific gesture input, or the like. This may be determined based on an actual use requirement, and is not specifically limited in this embodiment of this disclosure.

Step 112b: In a case that the fifth input is a preset input, the terminal device displays the first pattern on the first screen and displays the at least one icon in the first region in response to the fifth input.

Optionally, the input track of the fifth input may be a track the same as the first pattern, or may be a first track, where the first track may be one track associated with the first pattern but different from the first pattern. The first track may be determined based on an actual use requirement, and is not limited in this embodiment of this disclosure.

Optionally, the icon display method provided in this embodiment of this disclosure further includes: when the fifth input is not a preset input, the first pattern is not displayed on the first screen, and the at least one icon is nor displayed in the first region.

Figure 14A:
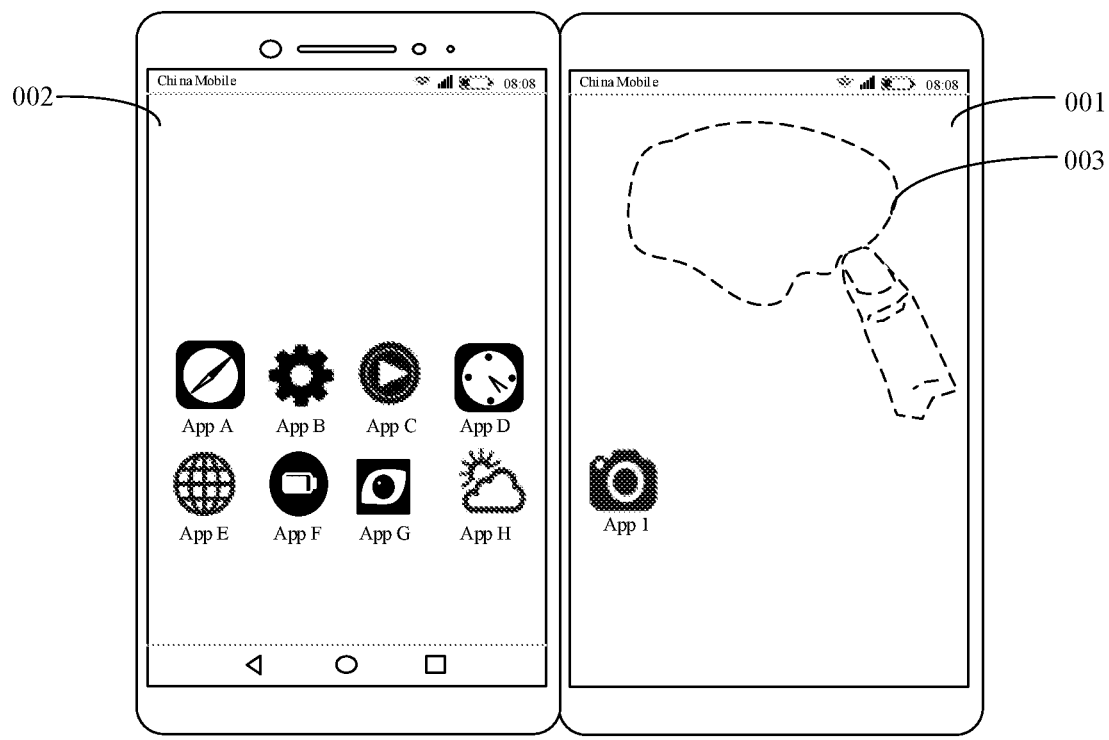
FIG. 14A is a first schematic diagram of displaying at least one icon in an aggregate manner according to an embodiment of this disclosure.
Figure 14B:
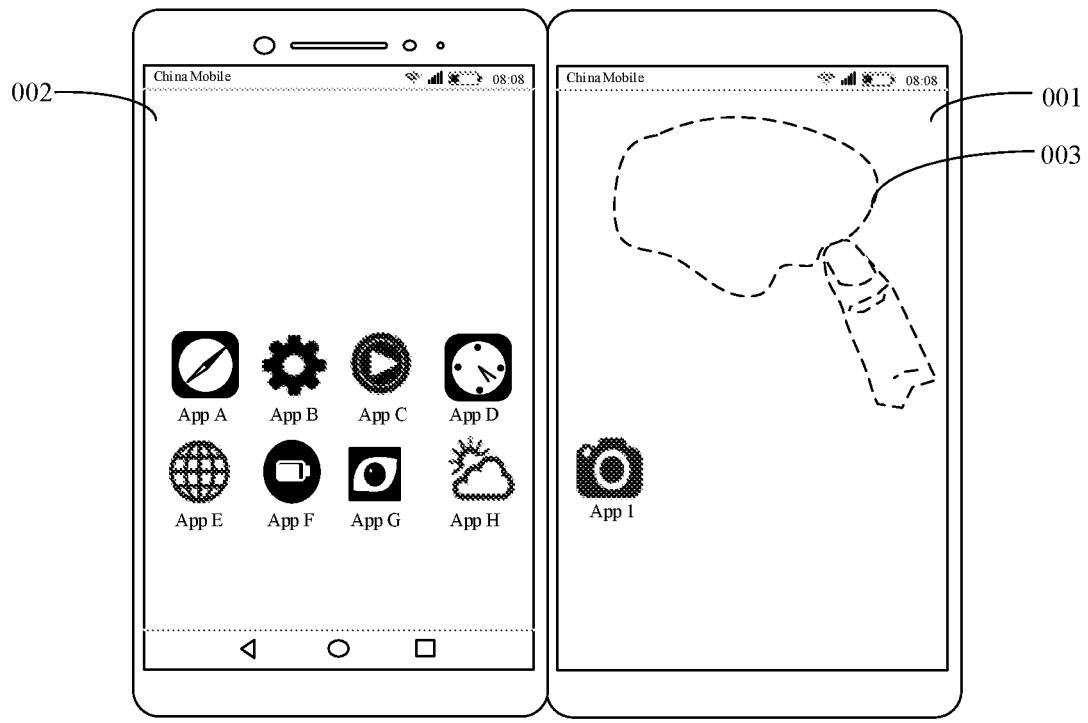
FIG. 14B is a second schematic diagram of displaying at least one icon in an aggregate manner according to an embodiment of this disclosure.

For example, it is assumed that the user needs to travel frequently, the user may set several application programs (such as a weather application program, a travel application program, and a catering application program) frequently used during business trips for aggregate display. In this case, the aggregate display condition is that the fifth input of the user is received and the input track of the fifth input matches the first pattern. The terminal device periodically monitors whether an input of drawing the first pattern by the user on the first screen is received. As shown in FIG. 14A, if the terminal device receives the input of drawing the first pattern 003 by the user on the first screen, the terminal device may display the first pattern 003 on the first screen 001, and display the icon of the "App E" and an icon of an "App D" in the first region selected by the first pattern 003, as shown in FIG. 14B.

In the icon display method provided in this embodiment of this disclosure, in a case that an input by the user received by the terminal device is a preset input, the at least one icon is aggregated and displayed in the first region again, so as to meet an actual use requirement of the user. For example, based on a specific event (such as a business trip), the user wants to use the at least one icon; in this case, an icon required by the user can be quickly invoked, thereby reducing complexity of an operation of searching for the icon, and reducing time for the user.

It should be noted that, in the embodiments of this disclosure, the icon display methods shown in the foregoing figures each are exemplarily described by using one of the figures in the embodiments of this disclosure as an example. In an implementation, the icon display methods shown in the foregoing figures may alternatively be implemented with reference to any other combinable figures illustrated in the foregoing embodiments, and details are not repeated herein.

Figure 15:
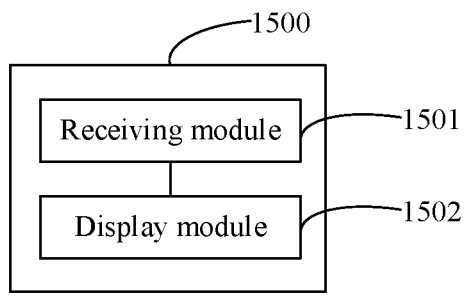
FIG. 15 is a schematic structural diagram of a terminal device according to an embodiment of this disclosure.

As shown in FIG. 15, an embodiment of this disclosure provides a terminal device 1500. The terminal device may include a first screen and a second screen. The terminal device may include a receiving module 1501 and a display module 1502. The receiving module 1501 may be configured to receive a first input by a user. The display module 1502 may be configured to: in response to the first input received by the receiving module 1501, display a first pattern on a first screen, where the first pattern is used for selecting a first region, and the first region is a region in which the first input is located. The receiving module 1501 is further configured to receive a second input on a first icon by the user on a second screen. The display module 1502 is further configured to: in response to the second input received by the receiving module 1501, display the first icon in the first region.

Optionally, in this embodiment of this disclosure, the display module 1502 may be further configured to: after the receiving module 1501 receives the first input by the user, in response to the first input received by the receiving module 1501, display a second pattern on the second screen, where the second pattern is used for selecting a second region, and a position of the second region on the second screen is associated with a position of the first region on the first screen. The display module 1502 is further configured to: after the receiving module 1501 receives the second input by the user, in response to the second input received by the receiving module 1501, display the first icon in the second region.

Optionally, in this embodiment of this disclosure, the position of the second region on the second screen being associated with the position of the first region on the first screen includes: there is a mapping relationship between the position of the second region on the second screen and the position of the first region on the first screen; or there is a mirroring relationship between the position of the second region on the second screen and the position of the first region on the first screen.

Optionally, in this embodiment of this disclosure, the display module 1502 may be configured to display the first icon with a first display effect in the first region, and display the first icon with a second display effect in the second region.

Optionally, in this embodiment of this disclosure, the receiving module 1501 may be further configured to receive a third input by the user. The display module 1502 may be further configured to: in response to the third input received by the receiving module 1501, cancel display of the first pattern, remain display of the first icon with the first display effect in the first region, and cancel display of the second pattern and display of the first icon in the second region.

Optionally, in this embodiment of this disclosure, the first region may be one icon display position. The display module 1502 may be configured to: in a case that the first region is a blank region, display the first icon in the first region; or in a case that a second icon is displayed in the first region, display a folder icon in the first region, where the folder icon includes the first icon and the second icon.

Optionally, in this embodiment of this disclosure, the receiving module 1501 is further configured to: in a case that the display module 1502 displays at least one icon in the first region, receive a fourth input by the user, where the fourth input is used for setting an aggregate display condition, and the aggregate display condition is used for triggering display of the at least one icon in the first region. The display module 1502 is further configured to: in a case that the terminal device meets the aggregate display condition, display the first pattern on the first screen and display the at least one icon in the first region.

Optionally, in this embodiment of this disclosure, the aggregate display condition includes at least one of the following: a system time of the terminal device belongs to a preset time period; a location at which the terminal device is located is a preset location; a fifth input by the user is received, where an input track of the fifth input matches the first pattern; or preset target information indicates a target event, where the target information includes at least one preset type of first information for the terminal device, or the target information includes second information input by the user.

Optionally, in this embodiment of this disclosure, the aggregate display condition includes: a fifth input by the user is received, where an input track of the fifth input matches the first pattern. The receiving module 1501 is further configured to receive the fifth input by the user. The display module 1502 is further configured to: in a case that the input track of the fifth input matches the first pattern, display the first pattern on the first screen and display the at least one icon in the first region in response to the fifth input.

The terminal device provided in this embodiment of this disclosure is capable of implementing the processes that are implemented by the terminal device in the foregoing method embodiments. To avoid repetition, details are not described herein again.

An embodiment of this disclosure provides a terminal device, and the terminal device may include a first screen and a second screen. A user can trigger the terminal device through a first input to select a first region on a first screen; therefore, in a case that the first region is in a selected state, the user can move at least one icon from a second screen to the first region of the first screen through the second input. In this way, the user can quickly move at least one icon from one screen to a user-specified region of another screen, thereby simplifying an operation process of moving an icon between different screens of the terminal device in this embodiment of this disclosure.

Figure 16:
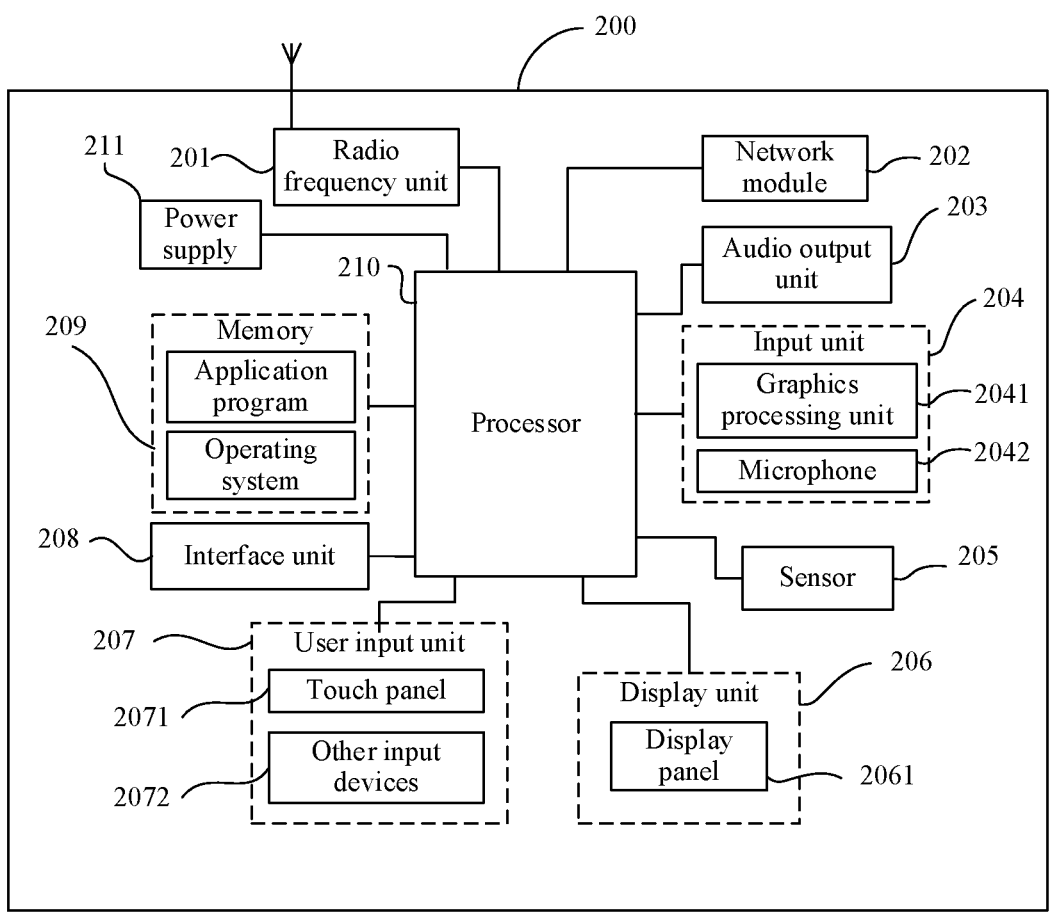
FIG. 16 is a schematic hardware diagram of a terminal device according to an embodiment of this disclosure.

FIG. 16 is a schematic diagram of a hardware structure of a terminal device for implementing the embodiments of this disclosure. Referring to FIG. 16, the terminal device 200 includes but is not limited to components such as a radio frequency unit 201, a network module 202, an audio output unit 203, an input unit 204, a sensor 205, a display unit 206, a user input unit 207, an interface unit 208, a memory 209, a processor 210, and a power supply 211. A person skilled in the art can understand that the structure of the terminal device shown in FIG. 16 does not constitute any limitation on the terminal device. The terminal device may include more or fewer components than those shown in the figure, or a combination of some components, or the components disposed differently. In this embodiment of this disclosure, the terminal device includes but is not limited to a mobile phone, a tablet computer, a laptop computer, a personal digital assistant, an in-vehicle terminal device, a wearable device, a pedometer, and the like.

The user input unit 207 may be configured to receive a first input by a user. The display unit 206 may be configured to: in response to the first input received by the user input unit 207, display a first pattern on a first screen, where the first pattern is used for selecting a first region, and the first region is a region in which the first input is located. The user input unit 207 is further configured to receive a second input on a first icon by the user on a second screen. The display unit 206 may be further configured to: in response to the second input received by the user input unit 207, display the first icon in the first region.

An embodiment of this disclosure provides a terminal device, and the terminal device may include a first screen and a second screen. A user can trigger the terminal device through a first input to select a first region on a first screen; therefore, in a case that the first region is in a selected state, the user can move at least one icon from a second screen to the first region of the first screen through the second input. In this way, the user can quickly move at least one icon from one screen to a user-specified region of another screen, thereby simplifying an operation process of moving icons between different screens of the terminal device in this embodiment of this disclosure.

It should be understood that in this embodiment of this disclosure, the radio frequency unit 201 may be configured to: receive and transmit signals in an information receiving/sending process or a call process; and for example, after receiving downlink data from a base station, transmit the downlink information to the processor 210 for processing, and in addition, transmit uplink data to the base station. Generally, the radio frequency unit 201 includes but is not limited to an antenna, at least one amplifier, a transceiver, a coupler, a low noise amplifier, a duplexer, and the like. In addition, the radio frequency unit 201 may further communicate with a network and another device through a wireless communications system.

The terminal device provides a user with wireless broadband internet access through the network module 202, for example, helping the user to transmit and receive e-mails, browse web pages, and access streaming media.

The audio output unit 203 may convert audio data received by the radio frequency unit 201 or the network module 202 or stored in the memory 209 into an audio signal, and output the audio signal as a sound. In addition, the audio output unit 203 may further provide audio output (for example, a call signal received sound or a message received sound) related to a specific function performed by the terminal device 200. The audio output unit 203 includes a speaker, a buzzer, a receiver, and the like.

The input unit 204 is configured to receive an audio or video signal. The input unit 204 may include a graphics processing unit (GPU) 2041 and a microphone 2042. The graphics processing unit 2041 processes image data of a still picture or video obtained by an image capture apparatus (such as a camera) in a video capture mode or an image capture mode. A processed image frame may be displayed on the display unit 206. An image frame processed by the graphics processing unit 2041 may be stored in the memory 209 (or another storage medium) or transmitted by the radio frequency unit 201 or the network module 202. The microphone 2042 can receive a sound and can process the sound into audio data. The processed audio data may be converted in a telephone call mode into a format that can be transmitted by the radio frequency unit 201 to a mobile communications base station, for outputting.

The terminal device 200 may further include at least one sensor 205, for example, an optical sensor, a motion sensor, and other sensors. The optical sensor may include an ambient light sensor and a proximity sensor. The ambient light sensor may adjust luminance of the display panel 2061 based on brightness of ambient light, and the proximity sensor may turn off the display panel 2061 and/or backlight when the terminal device 200 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 205 may also include a fingerprint sensor, a pressure sensor, an iris sensor, a molecular sensor, a gyroscope, a barometer, a hygrometer, a thermometer, an infrared sensor, and the like. Details are not described herein.

The display unit 206 is configured to display information input by the user or information provided to the user. The display unit 206 may include a display panel 2061, and the display panel 2061 may be configured in a form of a liquid crystal display (LCD), an organic light-emitting diode (OLED), or the like.

The user input unit 207 may be configured to receive input digit or character information and generate key signal input related to user setting and function control of the terminal device. The user input unit 207 may include a touch panel 2071 and other input devices 2072. The touch panel 2071, also referred to as a touchscreen, may capture a touch operation performed by the user on or near the touch panel (for example, an operation performed by the user on the touch panel 2071 or near the touch panel 2071 by using any appropriate object or accessory such as a finger or a stylus). The touch panel 2071 may include two parts: a touch detection apparatus and a touch controller. The touch detection apparatus detects a touch of the user, detects a signal brought by a touch operation, and transmits the signal to the touch controller. The touch controller receives touch information from the touch detection apparatus, converts the touch information into touch point coordinates, transmits the point coordinates to the processor 210, and receives and executes a command transmitted by the processor 210. In addition, the touch panel 2071 may be implemented in a plurality of forms, for example, a resistive, capacitive, infrared, or surface acoustic wave touch panel. The user input unit 207 may further include the other input devices 2072 in addition to the touch panel 2071. The other input devices 2072 may include but are not limited to a physical keyboard, a function key (such as a volume control key or a power on/off key), a trackball, a mouse, a joystick, and the like. Details are not described herein.

Optionally, the touch panel 2071 may cover the display panel 2061. When detecting a touch operation on or near the touch panel 2071, the touch panel 2071 transmits the touch operation to the processor 210 for determining a type of the touch event. Then, the processor 210 provides a corresponding visual output on the display panel 2061 based on the type of the touch event. Although in FIG. 16, the touch panel 2071 and the display panel 2061 act as two independent parts to implement input and output functions of the terminal device, in some embodiments, the touch panel 2071 and the display panel 2061 may be integrated to implement the input and output functions of the terminal device. This is not specifically limited herein.

The interface unit 208 is an interface between an external apparatus and the terminal device 200. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, an earphone port, and the like. The interface unit 208 may be configured to receive an input (for example, data information or power) from an external apparatus and transmit the received input to one or more elements within the terminal device 200, or may be configured to transmit data between the terminal device 200 and the external apparatus.

The memory 209 may be configured to store software programs and various data. The memory 209 may mainly include a program storage region and a data storage region. The program storage region may store an operating system, an application program required for at least one function (such as a sound play function and an image play function), and the like. The data storage region may store data created based on use of the mobile phone (such as audio data and a phone book), and the like. In addition, the memory 209 may include a high-speed random access memory, and may further include a non-volatile memory such as a disk storage device, a flash memory device, or another volatile solid-state storage device.

The processor 210 is a control center of the terminal device, uses various interfaces and lines to connect parts of the entire terminal device, and executes various functions and processing data of the terminal device by running or executing software programs and/or modules stored in the memory 209 and invoking data stored in the memory 209, so as to perform overall monitoring on the terminal device. The processor 210 may include one or more processing units. Optionally, an application processor and a modem processor may be integrated in the processor 210. The application processor primarily processes an operating system, user interfaces, application programs, and the like. The modem processor primarily processes radio communication. It can be understood that the modem processor may alternatively be not integrated in the processor 210.

The terminal device 200 may further include a power supply 211 (such as a battery) that supplies power to components. Optionally, the power supply 211 may be logically connected to the processor 210 through a power management system. In this way, functions such as charge management, discharge management, and power consumption management are implemented by using the power management system.

In addition, the terminal device 200 includes some functional modules that are not shown. Details are not described herein.

Optionally, an embodiment of this disclosure further provides a terminal device, including a processor 210, a memory 209, and a computer program stored in the memory 209 and executable on the processor 210, as shown in FIG. 16. When the computer program is executed by the processor 210, the processes of the foregoing method embodiment can be implemented, with same technical effects achieved. To avoid repetition, details are not described herein again.

An embodiment of this disclosure further provides a non-transitory computer-readable storage medium, where a computer program is stored in the non-transitory computer-readable storage medium. When the computer program is executed by a processor, the processes of the foregoing method embodiments are implemented, with the same technical effects achieved. To avoid repetition, details are not described herein again. The non-transitory computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An icon moving method, applied to a terminal device comprising a first screen and a second screen, wherein the method comprises:
    receiving a first input by a user;
    in response to the first input, displaying a first pattern on the first screen, wherein the first pattern is used for selecting a first region, and the first region is a region in which the first input is located;
    receiving a second input on a first icon by the user on the second screen; and
    in response to the second input, displaying the first icon in the first region; wherein
    after the receiving the first input by the user, the method further comprises:
    in response to the first input, displaying a second pattern on the second screen, wherein the second pattern is used for selecting a second region, and a position of the second region on the second screen is associated with a position of the first region on the first screen; and
    after the receiving the second input on the first icon by the user on the second screen, the method further comprises:
    in response to the second input, displaying the first icon in the second region.

2. The method according to claim 1, wherein the position of the second region on the second screen is associated with the position of the first region on the first screen comprises:
    there being a mapping relationship between the position of the second region on the second screen and the position of the first region on the first screen; or
    there being a mirroring relationship between the position of the second region on the second screen and the position of the first region on the first screen.

3. The method according to claim 1, wherein the displaying the first icon in the first region comprises:
    displaying the first icon with a first display effect in the first region; and
    the displaying the first icon in the second region comprises:
    displaying the first icon with a second display effect in the second region.

4. The method according to claim 3, wherein after the displaying the first icon with the second display effect in the second region, the method further comprises:
    receiving a third input by the user; and
    in response to the third input, canceling display of the first pattern, remaining display of the first icon with the first display effect in the first region, and canceling display of the second pattern and display of the first icon in the second region.

5. The method according to claim 1, wherein the first region is one icon display position, and the first region is a blank region or displays a second icon therein; and
the displaying the first icon in the first region comprises:
displaying the first icon in the first region, wherein the first region is the blank region; or
displaying a folder icon in the first region, wherein the first region displays the second icon therein, and the folder icon comprises the first icon and the second icon.

6. The method according to claim 1, wherein the method further comprises:
receiving a fourth input by the user, wherein the first region displays at least one icon therein, the fourth input is used for setting an aggregate display condition, and the aggregate display condition is used for triggering display of the at least one icon in the first region; and
after determining that the terminal device meets the aggregate display condition, displaying the first pattern on the first screen and displaying the at least one icon in the first region.

7. The method according to claim 6, wherein the aggregate display condition comprises at least one of:
a system time of the terminal device belongs to a preset time period;
a location at which the terminal device is located is a preset location;
a fifth input by the user is received, wherein an input track of the fifth input matches the first pattern; or
preset target information indicates a target event, wherein the target information comprises at least one preset type of first information for the terminal device, or the target information comprises second information input by the user.

8. A terminal device, comprising a processor, a memory, and a computer program stored in the memory and executable on the processor, wherein the terminal device comprises a first screen and a second screen, and the computer program, when executed by the processor, causes the terminal device to perform:
receiving a first input by a user;
in response to the first input, displaying a first pattern on the first screen, wherein the first pattern is used for selecting a first region, and the first region is a region in which the first input is located;
receiving a second input on a first icon by the user on the second screen; and
in response to the second input, displaying the first icon in the first region; wherein
the computer program, when executed by the processor, causes the terminal device further to perform:
in response to the first input, displaying a second pattern on the second screen, wherein the second pattern is used for selecting a second region, and a position of the second region on the second screen is associated with a position of the first region on the first screen; and
in response to the second input, displaying the first icon in the second region.

9. The terminal device according to claim 8, wherein the position of the second region on the second screen is associated with the position of the first region on the first screen comprises:
there being a mapping relationship between the position of the second region on the second screen and the position of the first region on the first screen; or
there being a mirroring relationship between the position of the second region on the second screen and the position of the first region on the first screen.

10. The terminal device according to claim 8, wherein the computer program, when executed by the processor, causes the terminal device to perform:
displaying the first icon with a first display effect in the first region; and
displaying the first icon with a second display effect in the second region.

11. The terminal device according to claim 10, wherein the computer program, when executed by the processor, causes the terminal device further to perform:
receiving a third input by the user; and
in response to the third input, canceling display of the first pattern, remaining display of the first icon with the first display effect in the first region, and canceling display of the second pattern and display of the first icon in the second region.

12. The terminal device according to claim 8, wherein the first region is one icon display position, and the first region is a blank region or displays a second icon therein; and
the computer program, when executed by the processor, causes the terminal device to perform:
displaying the first icon in the first region, wherein the first region is the blank region; or
displaying a folder icon in the first region, wherein the first region displays the second icon therein, and the folder icon comprises the first icon and the second icon.

13. The terminal device according to claim 8, wherein the computer program, when executed by the processor, causes the terminal device further to perform:
receiving a fourth input by the user, wherein the first region displays at least one icon therein, the fourth input is used for setting an aggregate display condition, and the aggregate display condition is used for triggering display of the at least one icon in the first region; and
after determining that the terminal device meets the aggregate display condition, displaying the first pattern on the first screen and displaying the at least one icon in the first region.

14. The terminal device according to claim 13, wherein the aggregate display condition comprises at least one of:
a system time of the terminal device belongs to a preset time period;
a location at which the terminal device is located is a preset location;
a fifth input by the user is received, wherein an input track of the fifth input matches the first pattern; or
preset target information indicates a target event, wherein the target information comprises at least one preset type of first information for the terminal device, or the target information comprises second information input by the user.

15. A non-transitory computer-readable storage medium, wherein a computer program is stored in the non-transitory computer-readable storage medium, and the computer program, when executed by a processor of a terminal device comprising a first screen and a second screen, causes the terminal device to perform:
receiving a first input by a user;
in response to the first input, displaying a first pattern on the first screen, wherein the first pattern is used for selecting a first region, and the first region is a region in which the first input is located;

receiving a second input on a first icon by the user on the second screen; and in response to the second input, displaying the first icon in the first region; wherein the computer program, when executed by the processor, causes the terminal device further to perform:

in response to the first input, displaying a second pattern on the second screen, wherein the second pattern is used for selecting a second region, and a position of the second region on the second screen is associated with a position of the first region on the first screen; and in response to the second input, displaying the first icon in the second region.

16. The non-transitory computer-readable storage medium according to claim 15, wherein that the position of the second region on the second screen is associated with the position of the first region on the first screen comprises:

there being a mapping relationship between the position of the second region on the second screen and the position of the first region on the first screen; or there being a mirroring relationship between the position of the second region on the second screen and the position of the first region on the first screen.

17. The non-transitory computer-readable storage medium according to claim 15, wherein the computer program, when executed by the processor, causes the terminal device to perform:

displaying the first icon with a first display effect in the first region; and displaying the first icon with a second display effect in the second region.

* * * * *